(12) United States Patent  
Kalhok et al.

(10) Patent No.: US 6,547,027 B1  
(45) Date of Patent: Apr. 15, 2003

(54) ALL TERRAIN VEHICLE

(75) Inventors: David Kalhok, Marion, IL (US); Pierre Rondeau, St-Denis-de-Brompton (CA); Martin Portelance, Sherbrooke (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 09/574,234

(22) Filed: May 19, 2000

(51) Int. Cl.⁷ .............................................. B62D 21/00
(52) U.S. Cl. ...................... 180/312; 180/210; 180/215; 280/156; 280/157; 297/195.1
(58) Field of Search .................. 280/156, 157, 280/848, 849; 180/210, 215, 219, 908, 311, 312, 190, 191; 297/195.1, 195.12; 114/363

(56) References Cited

U.S. PATENT DOCUMENTS

| | | | |
|---|---|---|---|
| 1,910,635 A | * 5/1933 | Persons | |
| 4,325,562 A | * 4/1982 | Yamada et al. | 180/215 |
| 4,413,700 A | * 11/1983 | Shiratsuchi | 180/219 |
| 4,457,524 A | * 7/1984 | Yoshiwara | 180/219 |
| 4,744,432 A | * 5/1988 | Shibata et al. | 180/68.1 |
| 4,836,324 A | * 6/1989 | Morita et al. | 180/312 |
| 5,074,573 A | * 12/1991 | Dick | 280/156 |
| 5,353,734 A | * 10/1994 | Tani | 114/363 |
| 6,109,621 A | * 8/2000 | Hettich et al. | 280/156 |

FOREIGN PATENT DOCUMENTS

JP        60-124581 A   *  7/1985

OTHER PUBLICATIONS

Bombardier, Parts Catalog 2000, DS 650–13 Nov. 1999—704 300 001.
Honda Motorcycles, 1986 FourTrax 250R, www.hondamotorcycle.com/classics/1986fourtrax250r/index.html, 3 pages.
Yamaha Motorcycles, www.yamaha–motor.com/01motorsports/01atv/gallerybody.html, 3 pages.
Sea–Doo Parts Catalog, 1998, GTX RFT 5666–5843, (4 pages).
Sea–Doo Parts Catalog, 1998, XP Limited 5665/5667 (5 pages).
Sea–Doo Parts Catalog, 1998, GTS 5819 (5 pages).

* cited by examiner

*Primary Examiner*—Eric Culbreth
(74) *Attorney, Agent, or Firm*—Pillsbury Winthrop LLP

(57) ABSTRACT

An all terrain vehicle, also known as an ATV, has a seat designed to comfortably accommodate a rider over a wide variety of rugged terrain. The seat is profiled so that the rider may easily shift body weight and lean with the vehicle while traversing steep and uneven terrain. The seat has a dip and taper positioned beneath a riders' knee and lower thigh to provide the profile. The ATV is also provided with front fenders and mud flaps to protect the rider from debris. The fenders rotate with the wheel to provide the rider with maximum wheel visibility and access. The fenders can also be releasable, thereby rotating around the axis of rotation of the front wheels to break free from obstacles and provide easy access to the wheels beneath the fender. The ATV provides exceptional rider comfort and control.

42 Claims, 20 Drawing Sheets

ALL TERRAIN VEHICLE

BACKGROUND OF THE INVENTION

1. Field of Invention

The invention relates to a wheeled vehicle adapted to traverse a variety of terrain. The invention particularly relates to straddle-type vehicles commonly known as sport all terrain vehicles or sport ATVs.

2. Description of Related Art

ATVs have become very popular consumer products in recent years. These vehicles are typically used by one rider to travel undeveloped terrain, often called "off-road" connoting the lack of paved or even defined paths. ATVs are used for both off-road work and recreation. Due to the off-road use, ATVs commonly encounter obstacles such as rocks, steep hills, and ditches and may travel over loose, granular fill, unstable mud or shallow water.

To accommodate the different, and often rugged, terrain, such vehicles are generally designed with a powerful drive system to enhance mobility and traction and provide sufficient force to push or pull various objects. Additionally, as these vehicles may be required to travel over or under obstacles, ATVs are typically designed to be as compact and light-weight as possible to allow a rider to maneuver the vehicle in difficult circumstances. In some cases, a rider must manually move or free the vehicle by pushing, pulling or tipping the vehicle.

In prior ATVs, certain elements have been added in response to the above noted problems and conditions faced by the vehicle and its rider. For example, fenders and mud flaps are typically provided to shield the rider from spray of debris and mud. However, such fenders can obscure the rider's view of the wheels, thus inhibiting the rider's ability to avoid or assess obstacles. Also, fenders sufficiently sized to protect a rider often interfere with ground obstacles and become damaged or break off. Additionally, fenders tend to collect mud and debris, which can accumulate above the wheel eventually interfering with rotation of the wheel.

Protective covers may also be provided over the engine compartment to shield the engine from debris and damage. The front of the vehicle, in particular, may be provided with protective coverings over the radiator, the head lamps, and the control elements, for example.

At times due to the conditions encountered off-road, it may be desirable or necessary to physically move the vehicle. To assist riders in manually moving the ATV, many prior vehicles have grab bars located on the vehicle. However, these grab bars must be securely attached to a frame member and cannot protrude too far from the vehicle, lest the bar interfere with its operation.

As a result of traversing such rugged terrain, the rider is often subjected to an uneven or unbalanced ride. It may be necessary, depending on the inclination of the vehicle or slope of the terrain, for the rider to balance the vehicle by shifting his or her body weight or leaning against the tilt of the vehicle. Often, riders must clamp onto the seat or body of the ATV with their legs to maintain control and remain astride the vehicle.

Additionally, the rider, who straddles the vehicle and rides on an open seat, often experiences a rough ride, which can cause discomfort during lengthy expeditions. In particularly rough terrain, a rider tends to get jostled. Such vehicles should provide adequate suspension to comfort the rider and allow the rider to remain on the vehicle over most terrain.

Another problem encountered by an ATV when traveling on uneven or sloped terrain is continuous engine operation. When an ATV is tilted or even tipped on its side, engine operation can be compromised or interrupted if flow of required engine fluids is prevented. For example, a gravity oil feed system must be oriented substantially vertically to operate. When an ATV with gravity oil feed is tipped on its side, oil will not be properly supplied to the other engine components seriously compromising engine performance and durability.

Accordingly, stability and ease of operation with a high degree of control is important for both engine performance and rider comfort.

SUMMARY OF THE INVENTION

An aspect of the embodiments of this invention is to provide a stable vehicle that is able to traverse a wide range of off-road conditions.

Another aspect is to protect the rider of the all terrain vehicle from debris without compromising performance by obscuring visibility or interfering with obstacles.

A further aspect is to provide a versatile yet stable seating arrangement to allow a rider improved control and comfort while seated.

An additional aspect is to assist the rider in maneuvering the vehicle in a variety of conditions.

According to embodiments of this invention, a vehicle is provided that has a frame with a front portion, a rear portion, a lower portion and an upper portion, and a plurality of wheels supported for rotation by the frame, including at least one front wheel and at least one rear wheel. A contoured seat is provided for a rider supported by the upper portion of the frame. The seat has a profile including a central section having a first height with respect to a horizontal support surface and an end section having a second height with respect to the horizontal support surface. The first height is less than the second height. The seat is tapered from a wide end toward a narrowed section that coincides with the central section.

A drive assembly is supported by the frame and includes an engine and a drive system connected to at least one of the wheels to impart drive power to the at least one wheel. A vehicle control assembly is also provided and includes a steering mechanism supported by the frame and connected to the at least one front wheel to turn the at least one front wheel about a vertical axis, a power controller connected to the engine to control the drive power imparted by the drive system, and a braking mechanism connected to at least one of the wheels to inhibit rotation of the at least one wheel.

Also according to the aspects of embodiments of this invention, a vehicle is provided that includes a frame with a front portion, a rear portion, a lower portion and an upper portion, and a plurality of rotatable wheels, each wheel connected to a wheel support coupled to the frame, including at least one front wheel and at least one rear wheel. A fender is positioned over the at least one front wheel, and a fender support is coupled to the fender and supported by the wheel support. A seat for a rider is supported by the upper portion of the frame. A drive assembly is supported by the frame and includes an engine and a drive system connected to at least one of the wheels to impart drive power to the at least one wheel.

A vehicle control assembly is also provided that includes a steering mechanism supported by the frame and connected to the wheel support of the at least one front wheel to turn the at least one front wheel about a vertical axis, a power controller connected to the engine to control the drive power imparted by the drive system, and a braking mechanism connected to at least one of the wheels to inhibit rotation of the at least one wheel. When the at least one front wheel is turned by the steering mechanism, the fender that is supported by the wheel support is turned about the same vertical axis with the at least one front wheel.

Preferably, the vehicle is a light-weight all terrain vehicle. The seat is preferably a straddle-type seat. Additionally, the preferred number of wheels includes two front wheels and two rear wheels.

Another aspect of this invention is to provide various additional features that are usable in combination on one vehicle, individually usable on separate vehicles or selectively combined on various vehicles, including different types of vehicles, such as vehicles with different wheel and seating configurations.

For example, an open U-shaped foot peg with a serrated edge can be provided to provide a strong, stable foot support that inhibits the accumulation of mud and debris on the foot peg.

A convex cover can be provided over the front of the vehicle or portions of the front of the vehicle, such as the radiator.

A front and/or back grab handle can be provided as bumpers attached to the upper portions of the main frame or extended frame positioned close to seat level to allow easy access for manual maneuvering of the vehicle.

The frame and engine placement can provide a low center of gravity. The wheels can also be significantly offset from center. A large suspension travel can provide the rider with a more secure ride.

The frame can be formed of a pair of one piece tubular members bent to the desired support shape, which can reduce the required welds and corresponding potential points of weakness.

An oil tank with a generally funnel shape and a sump portion can be used in a gravity feed system to reliably supply oil even when the vehicle is disposed at an angle.

These and other aspects of the invention will be apparent when taken in conjunction with the drawings and detailed description below.

BRIEF DESCRIPTION OF THE DRAWINGS

Referring to the drawings that form part of this original disclosure.

DETAILED DESCRIPTION OF PREFERRED EMBODIMENTS

Figure 1:
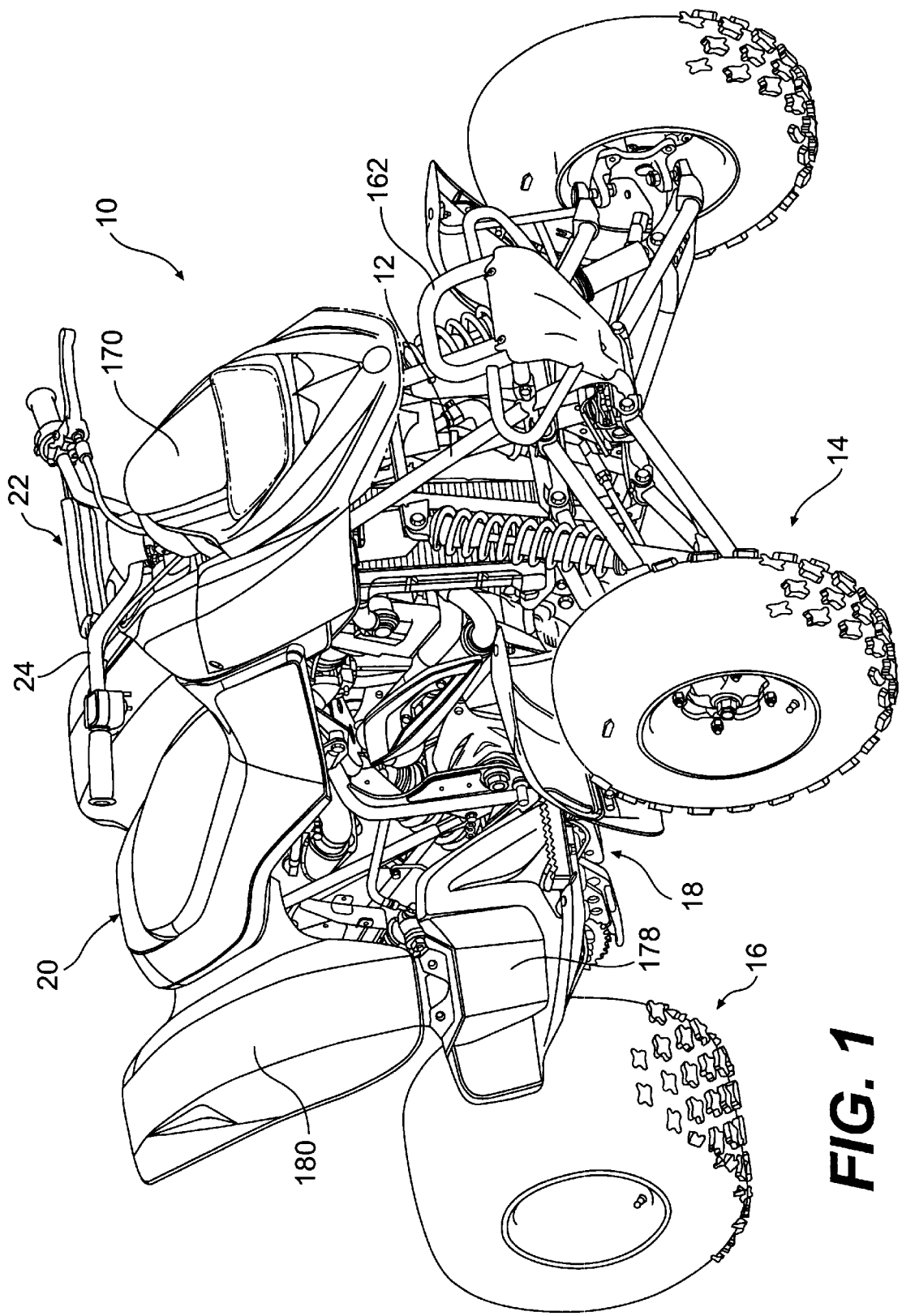
FIG. 1 is a perspective view of a vehicle in accordance with this invention.

A vehicle in accordance with the embodiments of this invention is illustratively shown in FIG. 1. The various elements described below are discussed for ease of explanation with reference to the vehicle 10 shown in the drawings. However, it will be understood by those skilled in the art that the various elements are usable, separately or in various combinations, on other types of vehicles.

Figure 15:
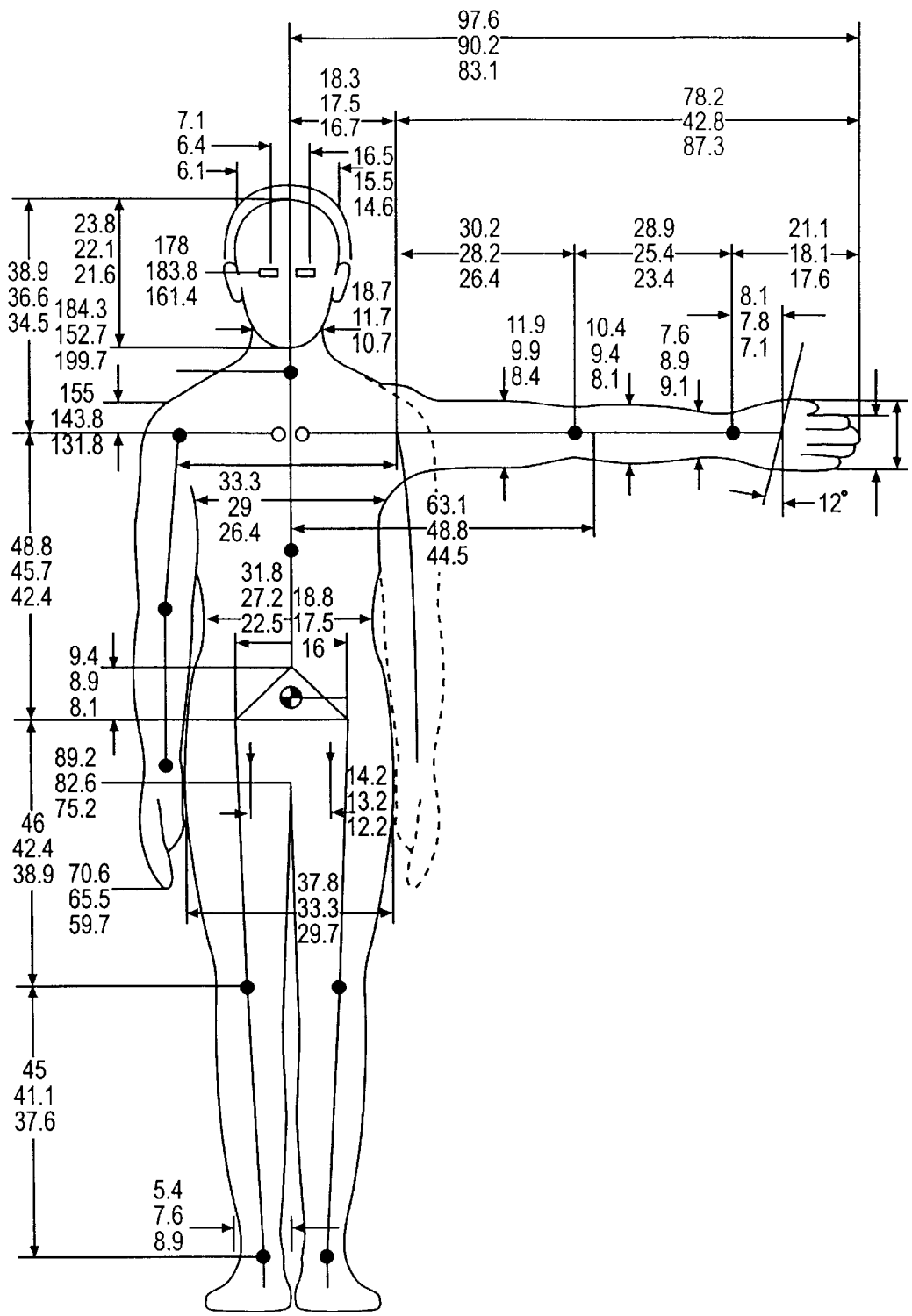
FIG. 15 is another schematic view of an average rider with standard dimensional ranges.
Figure 16:
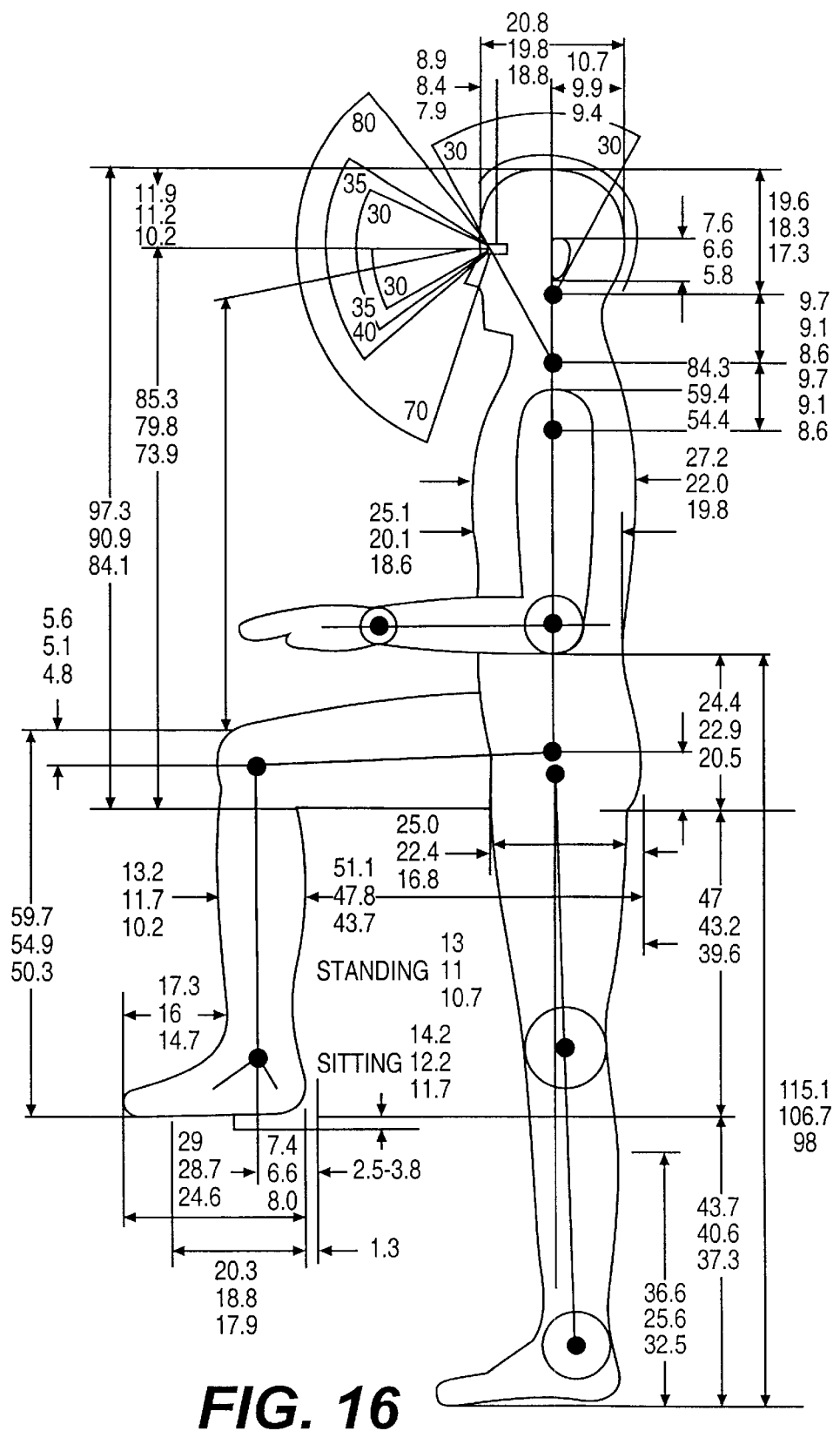
FIG. 16 is a schematic view of an average rider similar to FIG. 15.

Vehicle 10 is designed to comfortably accommodate an average rider 210, which as shown in FIGS. 15 and 16 is a $50^{th}$ percentile U.S. male with the range of dimensions shown on these drawings. Of course, in operation, a rider is any person that drives the vehicle and is not limited to the average size person 210 of FIGS. 15 and 16.

Vehicle 10 is preferably an all terrain vehicle used by a single rider. The vehicle is intended for recreation and, as described below, is designed to handle various terrain and conditions, particularly conditions termed "off-road". Of course, the vehicle is not limited to the uses and conditions described herein.

As seen in FIGS. 1–6, vehicle 10 comprises a main frame 12 with two front wheels 14 and two rear wheels 16 rotatably supported by main frame 12. The preferred configuration includes four wheels for enhanced stability. However, two or three wheel configurations are also possible. A drive system 18 is carried by main frame 12 and is preferably a relatively powerful system that delivers a high rate of torque to the front or back wheels of the vehicle as described below. The embodiment described herein uses a Rotax™ 650 engine, which is a 4 stroke, 1 cylinder double overhead cam shaft type. However, any suitable drive system could be substituted.

A seat 20 is supported by frame 12 for supporting a rider in a straddle position with a leg on each side of seat 20 supported by a foot rest 56. Connected to main frame 12 is a steering assembly 22 including handle bars 24 for use by the rider. As is conventionally known and best seen in FIG. 6, handle bars 24 carry hand grips 26, a front brake lever 28, a clutch lever 30 and various other switches. Preferably, handgrips 26 are spaced at a distance A above a horizontal surface (when the vehicle is at full droop) in range of 1080–1195 mm (42.5–47 inches), for example 1138 mm (44.8 inches). Also, handle bars 24 are preferably angled rearwardly at an angle α of about 17°. Preferably, handle bars 24 have a horizontal spread in the range of 730–810 mm (28.7–31.9 inches), for example 770 mm (30.3 inches).

Figure 7:
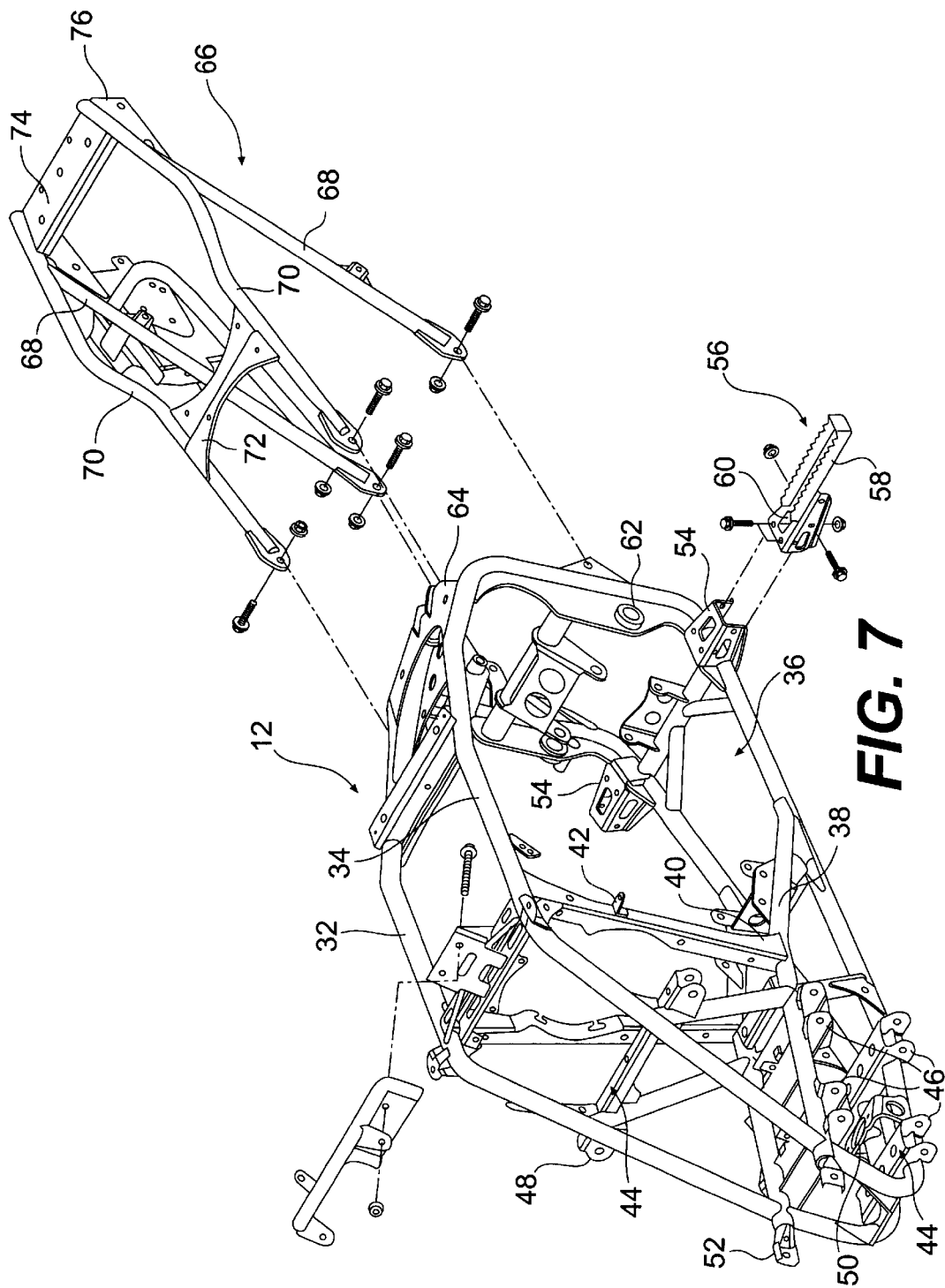
FIG. 7 is an exploded perspective view of the frame in accordance with this invention.

Referring to FIG. 7, main frame 12 is formed of two side frame pieces 32 and 34, which connect together to form a cavity 36. Each side frame piece, 34 for example, is preferably formed of a one piece tubular support that is bent into a polygon. The ends are connected at a common point to an intermediate support member 38, thus creating one joint for each side frame piece. This configuration facilitates manufacturing by reducing the number of joints that must be welded or otherwise connected and creates a strong, rigid frame with minimal points of weakness. Of course, each side frame piece could be formed of a plurality of individual members connected together into a polygon if desired.

For additional rigidity and to resist buckling and enhance strength, additional support members, shown as 40 in FIG. 7, can be used as desired. The number of intermediate and additional support members depends on the particular strength requirements and materials used for the vehicle. Frame pieces and support members are also used, and added as necessary, as support for attachment of various elements such as the engine and/or covers. As seen in FIG. 7, brackets, such as 42, are attached to the support members for attachment of other components of the vehicle as described below.

The frame members can be made of hollow pipes of steel, for example. The support members can be hollow pipes, flat straps, T-bars, channel members or I-beams depending on the strength, weight and cost parameters of the particular vehicle.

Side frame 32 is connected to side frame 34 by a series of spaced cross support members 44 that hold side frames 32, 34 in a fixed relationship with respect to each other and form cavity 36. Supported between upper portion and lower portion of main frame 12 in cavity 36 is drive system 18, mainly the engine, which is described below. The configuration of cross support members 44 varies depending on the location of the cross support members in the frame. In the vehicle shown in this example, the rear cross support members are tubular pipes, the top cross support members are I-beams, and the front, bottom cross support members are channel members.

The front of main frame 12 is generally triangular and slopes downwardly. The front of main frame 12 supports the front wheel assembly with cross support members 44 that, in this case, are four channel brackets 46 each extending outwardly from side frame pieces 32, 34. As described below, another cross support member 44 is disposed above channel brackets 46, also in the form of a channel bracket 48 extending outwardly from side frame pieces 32, 34. A seat 50 that receives steering assembly 22 is created by a cross strap between channel brackets 46. A pair of front bumper brackets 52 extend outwardly from the front portion of main frame 12 at the ends of intermediate support members 38.

Lower portion of main frame 12 includes brackets for retaining portions of the drive system 18, particularly the engine. Toward the rear portion of the lower portion of main frame 12, a pair of tapered brackets 54 extend from each side frame piece 32, 34. Each bracket supports a foot rest 56. Each foot rest 56 is formed as an open generally U-shaped peg that has a series of serrations 58 pointing upwardly. In the bottom of each foot rest 56, a series of openings 60 are provided. By this configuration, a rider can securely rest the foot with the serrations inhibiting slipping. The openings allow dirt and debris to fall through to the ground and discourage caking of mud and dirt in the foot rest 56. Foot rest 56 may be formed from a single piece of metal shaped into a U by bending a plate of material with opposed serrated edges at two longitudinal fold lines with openings preformed or punched after folding. Alternatively, foot rest 56 may be formed by bending a strip of material with one serrated edge at two transverse fold lines, thus forming a loop with an open bottom.

The top surface of foot rest 56 is preferably spaced from a horizontal support surface at a distance B, in a range of about 380–420 mm (15.0–16.5 inches), for example 400 mm (15.7 inches) (when the vehicle is at full droop). Foot rest 56 is spaced below handle bars 24 at a distance C, in a range of about 700–775 mm (27.6–30.5 inches), for example 738 mm (29.1 inches). Foot rest 56 is positioned from the rear edge of handle bars 24 at a distance D, in a range of about 225–255 mm (8.86–10.0 inches), for example about 240 mm (9.45 inches). In addition, foot rest 56 is positioned from the rear wheel axle at a distance E, in a range of about 535–595 mm (21.1–23.4 inches), for example 566 mm (22.3 inches).

Figure 8:
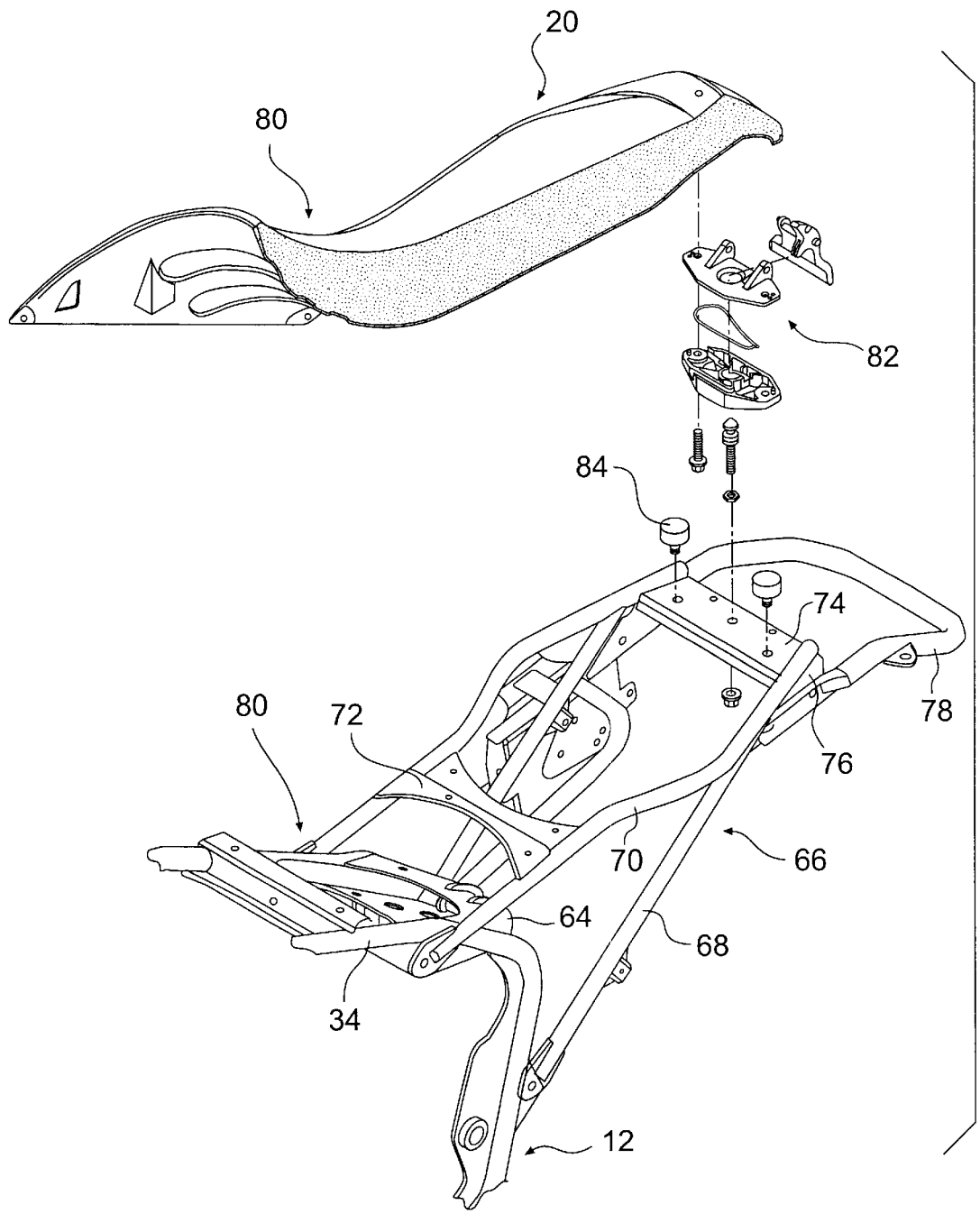
FIG. 8 is a partial perspective view of the frame and seat in accordance with this invention.

The rear portion of main frame 12 has a bracket 62 for supporting the rear wheel assembly and a bracket 64 for the suspension system. A frame extension 66 is attached to the rear portion of main frame as shown in FIGS. 7 and 8. Frame extension 66 forms a generally triangular shape when viewed from the side and has a pair of side arm supports 68 and 70 on each side. Cross arm supports 72 and 74 are provided to space the side arms from each other and to form a rigid frame assembly. Main frame 12 with frame extension 66 forms a generally rhomboidal frame unit. As seen in FIG. 8, brackets 76 are provided at the rear end of frame extension 66 to secure a rear bumper 78 thereto.

Rear bumper 78 is formed as a generally U-shaped handle and functions as a grab bar for a rider to pull or maneuver the vehicle manually when necessary. As seen in FIGS. 3–6, rear bumper 78 extends just beyond the rear wheels 16 to protect the vehicle from obstacles. Rear bumper 78 slopes downwardly to provide a rider with leverage when necessary to manually move the vehicle. Although shown as an attachment to frame extension 66, rear bumper could be integrally formed with frame extension 66. Similarly, frame extension 66 could be formed integrally with main frame 12.

Figure 8A:
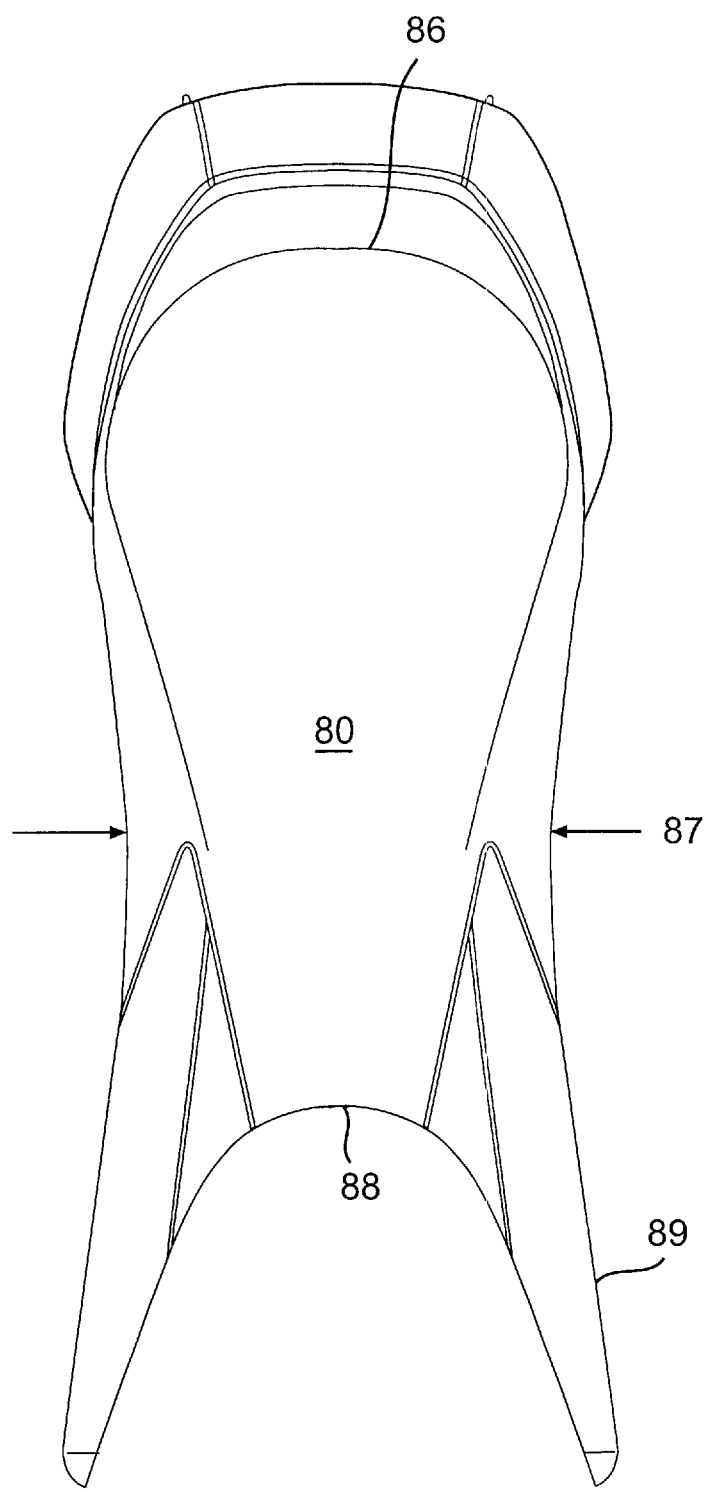
FIG. 8A is a plan view of the seat of FIG. 8.

Referring to FIG. 8, the upper portion of main frame 12 and frame extension 66 form a support surface for seat 20. The support surface is generally upwardly concave with the upper portion of main frame 12 and the upper portion of frame extension 66 meeting at an obtuse angle to form a V-shaped dip 80. Seat 20 is contoured to follow and complement dip 80 thus forming an upwardly concave seating surface. Seat 20 is also inwardly tapered at dip 80 so that the rider can securely clamp the lower legs on either side of dip 80. As seen in FIG. 8A, seat 20 has an inwardly tapered section 87 that coincides with dip 80. A pair of side wings 89 extend forward from dip 80 and inwardly tapered section 87. Side wings 89 are padded and form a clamping area for a rider's knees when a rider is shifted forward.

Seat 20 is formed of materials known for seating use on all terrain vehicles. Preferably, the seat is formed of a molded plastic contoured shell with a resilient, foam inner support member supported by the shell and a durable all weather outer surface covering, such as vinyl, formed over the resilient member.

As seen in FIG. 8, seat 20 can be secured with a hinge and latch onto the frame with a latch assembly 82 to provide access to the components beneath seat 20 if desired. Typically, access to the battery compartment is beneath the seat. Storage areas may also be provided. Resilient stoppers 84 prevent wear and rattle of seat 20 during operation. Of course, if desired, seat 20 can be fixed to the frame.

Figure 3:
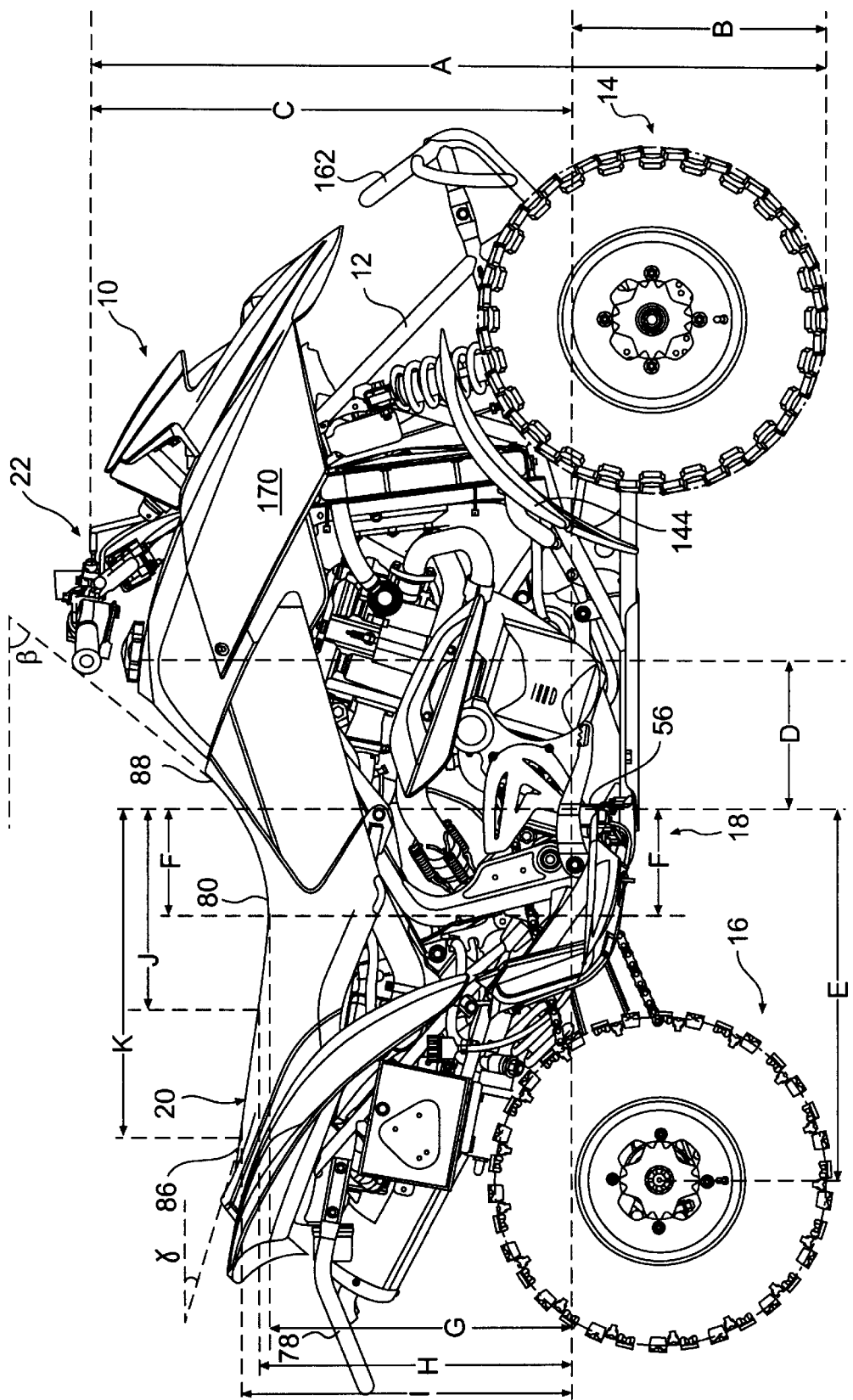
FIG. 3 is a side view of a vehicle in accordance with this invention.
Figure 5:
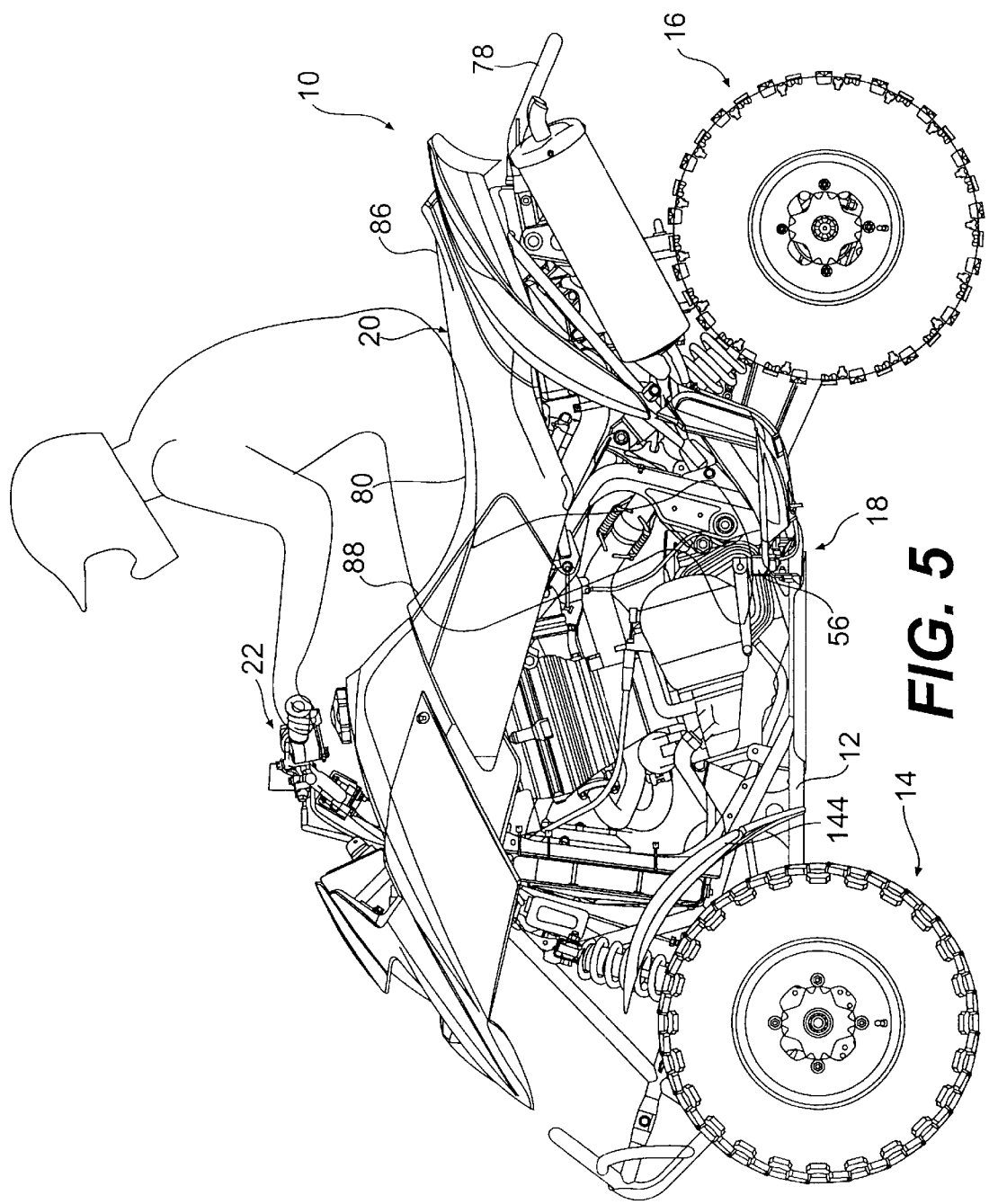
FIG. 5 is another side view of a vehicle in accordance with this invention.
Figure 6:
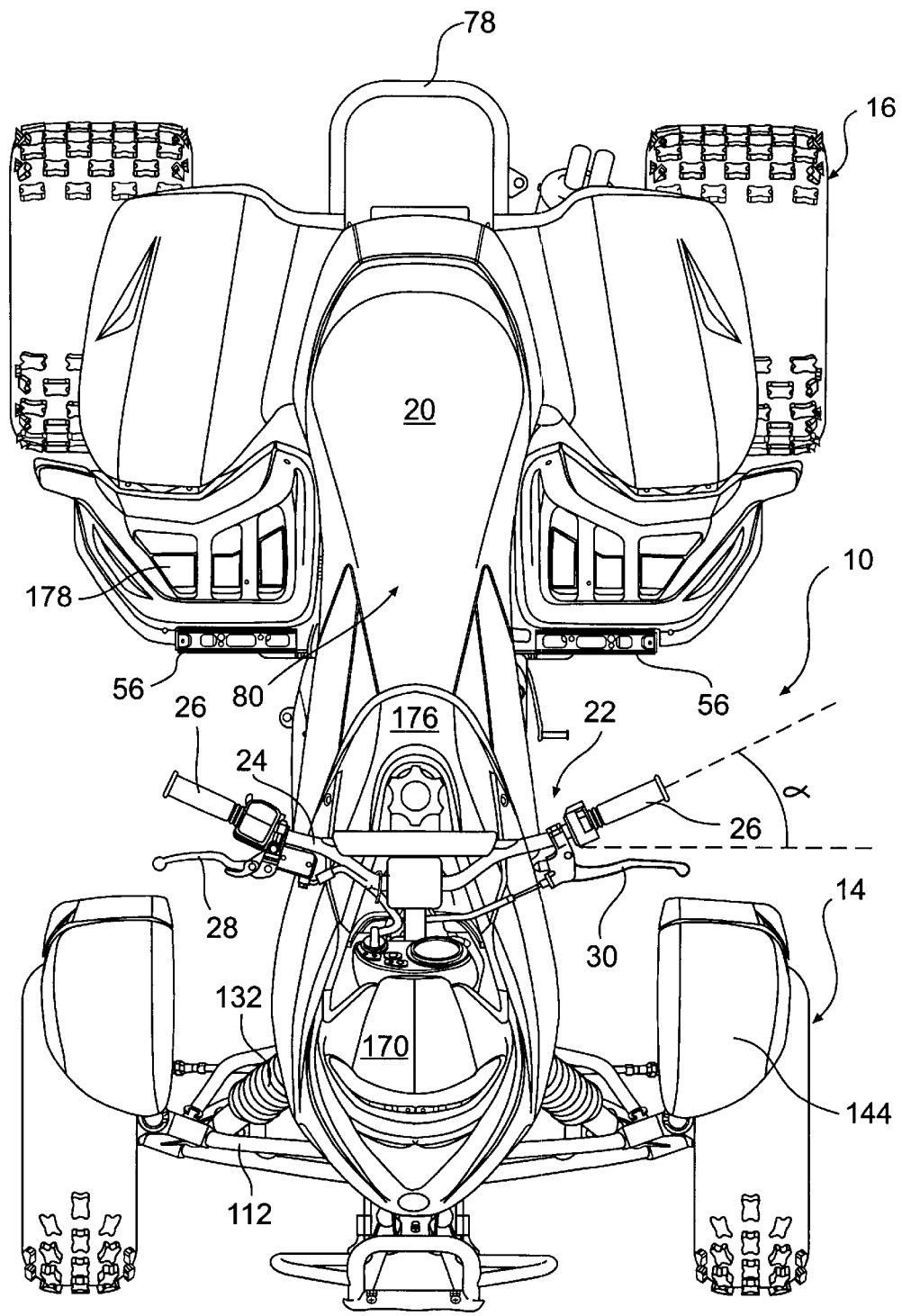
FIG. 6 is a top plan view of a vehicle in accordance with this invention.

As seen in FIGS. 3 and 5, the contour of seat 20 provides for a central dip 80 portion that slopes gradually up to a raised portion 86 at the rear of the vehicle. The rear end of seat 20 is preferably higher with respect to a horizontal support surface than dip 80. Also, rear portion 86 is preferably wider than tapered section 87. The front end of seat 20 is also preferably a raised portion 88 that is higher with respect to a horizontal support surface than dip 80. In the embodiment shown in FIGS. 3 and 5, front raised portion 88 is higher than rear raised portion 86. Front raised portion forms a cushioned area that protects a rider from impact with the gas tank or steering assembly, along with cushioned side wings 89 that allow a rider to bear against the sides of vehicle 10.

Front raised portion 88 is shown as an integral portion of seat 20. However, if desired, front raised portion 88 could be a separate cushioned component. Similarly, side wings 89 are shown as integral extensions of seat 20, but could be formed as separate cushioned or padded components. The relative vertical heights of the seat portions could also vary. For example, rear end of the seat could be level or tapered at the back so that the rear end is level with the dip portion. The relative taper can also vary, but it is desired that the tapered section be sufficiently narrow to allow a rider to sit comfortably and securely with the lower legs and knees straddling the vehicle. Preferably, tapered section 89 is about half as wide at the top of seat 20 than at the bottom of seat 20. For example, the width of the tapered section can be about 5.5 inches at the top, with the bottom width being about 11.5 inches.

Seat 20 can also be provided with only a tapered section 87, with no dip such that the side profile of the seat would be flat. Such a configuration would allow a rider to still clamp the sides of the seat while riding. Seat 20, in either configuration, could also be used on other vehicles, including but not limited to personal watercraft, snowmobiles or motorcycles.

FIG. 3 shows an example of preferred dimensions of seat 20 in which front raised portion 88 slopes at an angle β, of about 42° (at rest) toward dip 80. Rear raised portion 86 slopes upwardly at an angle γ from dip at an angle of about 7° at rest, and about 6° with a rider.

As seen in FIG. 8A, dip 80 coincides with a tapered area 89 of seat 20. Preferably, seat 20 tapers inwardly. Dip 80 is positioned generally vertically above foot rests 56 and spaced slightly rearwardly. Dip 80 and taper section 89 are designed to support a rider at the knee and lower thigh with the foot supported on foot rest 56. Thus, dip 80 is preferably spaced at a distance F, within about 130–145 mm (5.12–5.71 inches), for example 138 mm (5.43 inches) from foot rest 56 toward the rear of the vehicle. Likewise, dip 80 is preferably spaced at a distance G, in the range of about 445–495 mm (17.5–19.5 inches), for example about 471 mm (18.5 inches) above foot rests 56 to accommodate an average size rider. By this positioning, a rider is able to lean or slide sideward while riding to facilitate maneuvering the vehicle because the rider's knee is positioned slightly above the seat over dip 80. Seat 20 has an intermediate height H in a range of about 470–520 mm (18.5–20.5 inches), for example about 497 mm (19.6 inches) above foot rest 56. At its rear end, seat 20 also has a height I of about 495–550 mm (19.5–21.7 inches), for example 525 mm (20.7 inches) above foot rest 56. A distance J, measured from foot rest 56 to the height of the intermediate portion of the seat is in the range of about 330–367 mm (13.0–14.4 inches), for example 349 mm (13.7 inches). At a distance of K, measured from foot rest 56 to the rear of seat 20, is about 535–595 mm (21.1–23.4 inches), for example 566 mm (22.3 inches).

Figure 4:
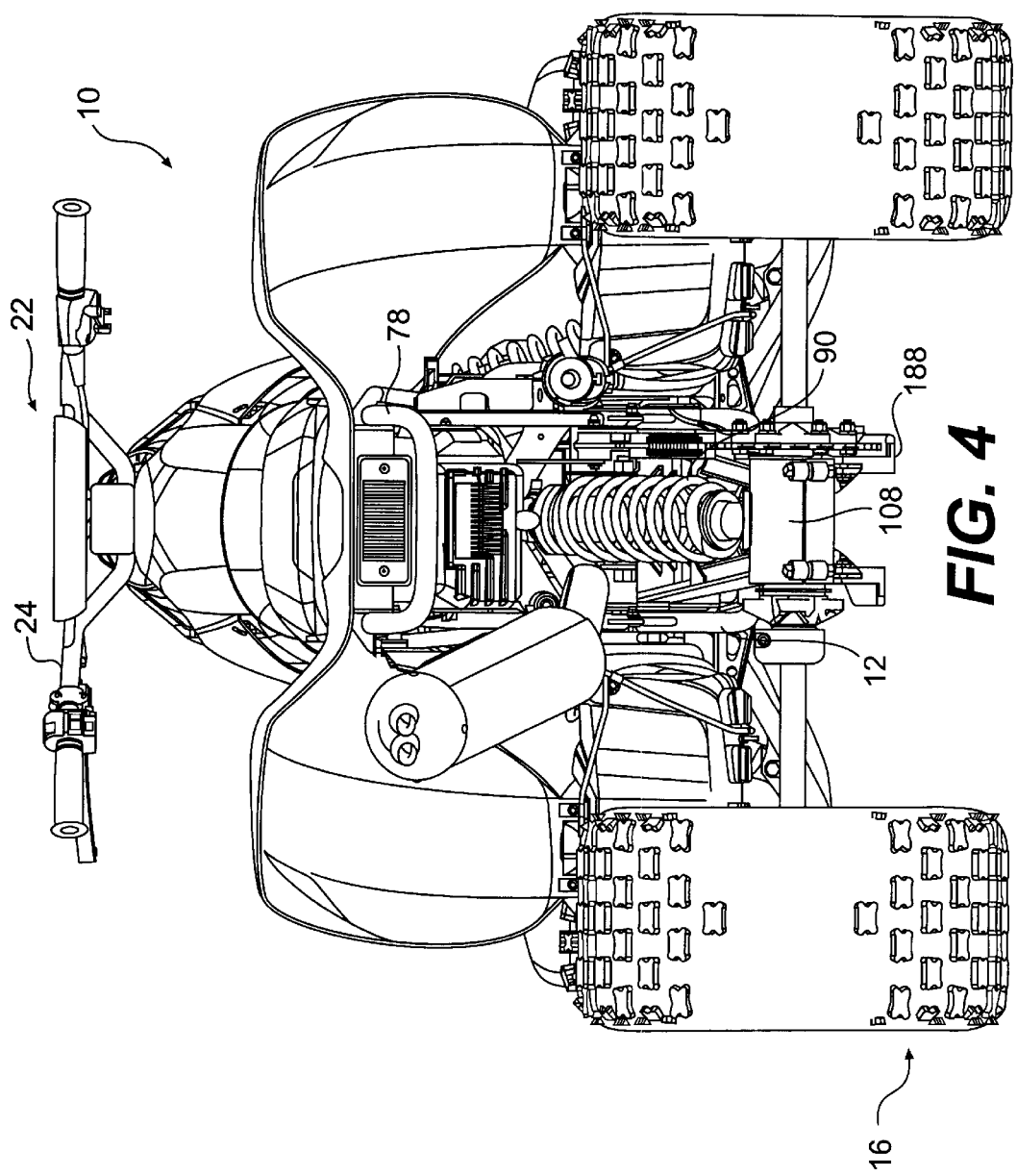
FIG. 4 is a back view of a vehicle in accordance with this invention.
Figure 9:
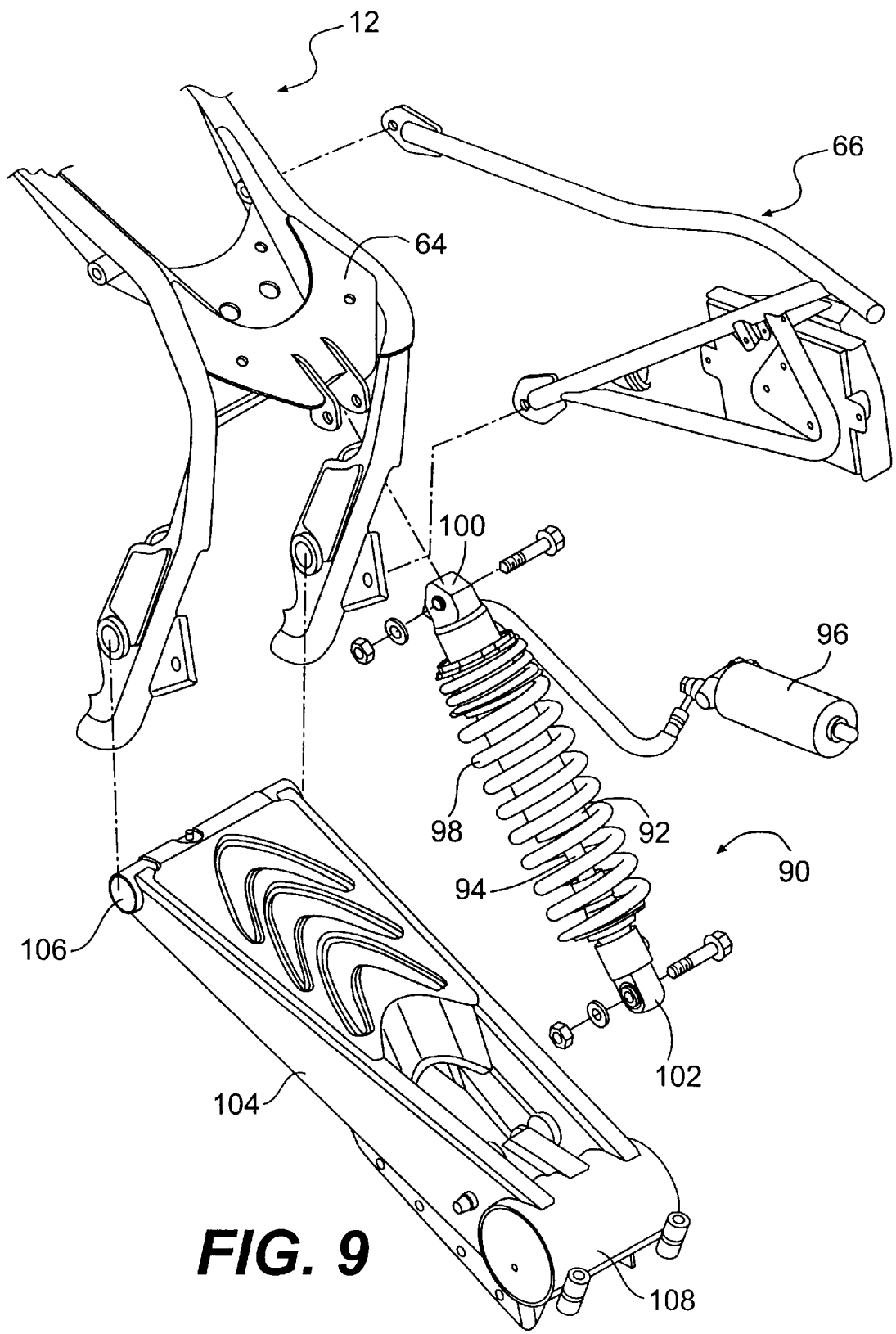
FIG. 9 is a partial exploded perspective view of the frame and rear suspension in accordance with this invention.

The rear suspension 90 is shown in detail in FIG. 9. As can be seen in FIGS. 4 and 7, rear suspension 90 extends from the upper portion of main frame 12 to the rear wheel assembly. The suspension assembly, including rear suspension 90 and the front suspension described below, provides a very large vertical travel distance, preferably in the range of 11–12 inches of vertical travel, which results in a smoother, more stable ride for a user. In this case, rear suspension 90 provides a vertical travel distance of about 292 mm (11.5 inches).

Rear suspension 90 includes a shock absorber with a central hydraulic cylinder 92, a piston 94 and compressed gas source 96 surrounded by a heavy duty helically wound spring 98. The top end I 00 of the shock absorber is attached to bracket 64 on main frame 12 with a conventional fastener. The other, bottom end 102 of the shock absorber is attached to the rear wheel assembly, also with a conventional fastener at a swing arm 104. Swing arm 104 is pivotally attached at end 106 to main frame 12 at bracket 62 and rotatably supports the rear wheel drive axle with a cylindrical support sleeve 108 that clamps around the rear axle, as seen in FIG. 4.

Figure 10:
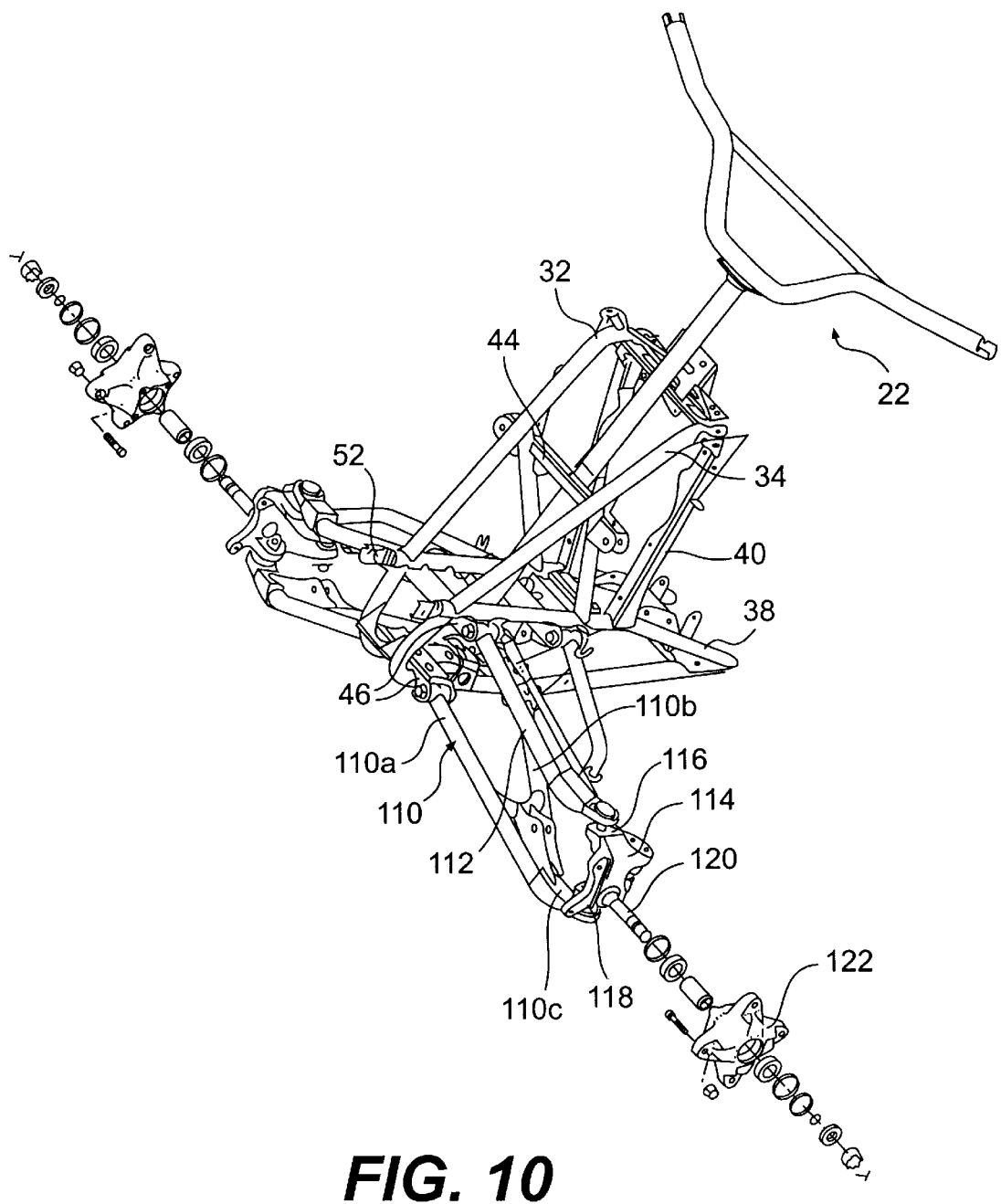
FIG. 10 is a partially exploded perspective view of the front of the frame in accordance with this invention.

Turning to the front portion of main frame 12, FIG. 10 shows the front portion of main frame 12 that supports the front wheel assembly. Extending from each side frame piece 32, 34 are a pair of extension arms. For example, lower arm 110 and upper arm 112 extend from side frame piece 34 and are pivotally connected at channel brackets 46. Similar extension arms extend from side frame piece 32 on the opposite side.

Each extension arm, lower arm 110 for example, is formed as a V-shaped support with each inner end of the arms 110a and 110b being connected to a channel bracket 46 and the vertex 110c being connected to a knuckle joint 114. Referring to knuckle joint 114 in FIGS. 10 and 11 for ease of explanation, pivotal connection points 116 and 118 are provided for upper and lower extension arms and an outwardly extending axle 120 is provided for attachment to the hub 122 for one of the front wheels 14. As seen in FIG. 10, a suitable fastener assembly including a series of o-rings, ball bearings, bushings, seals and nuts is provided to attach the wheel hub 122 to the axle 120 for rotation.

Figure 11:
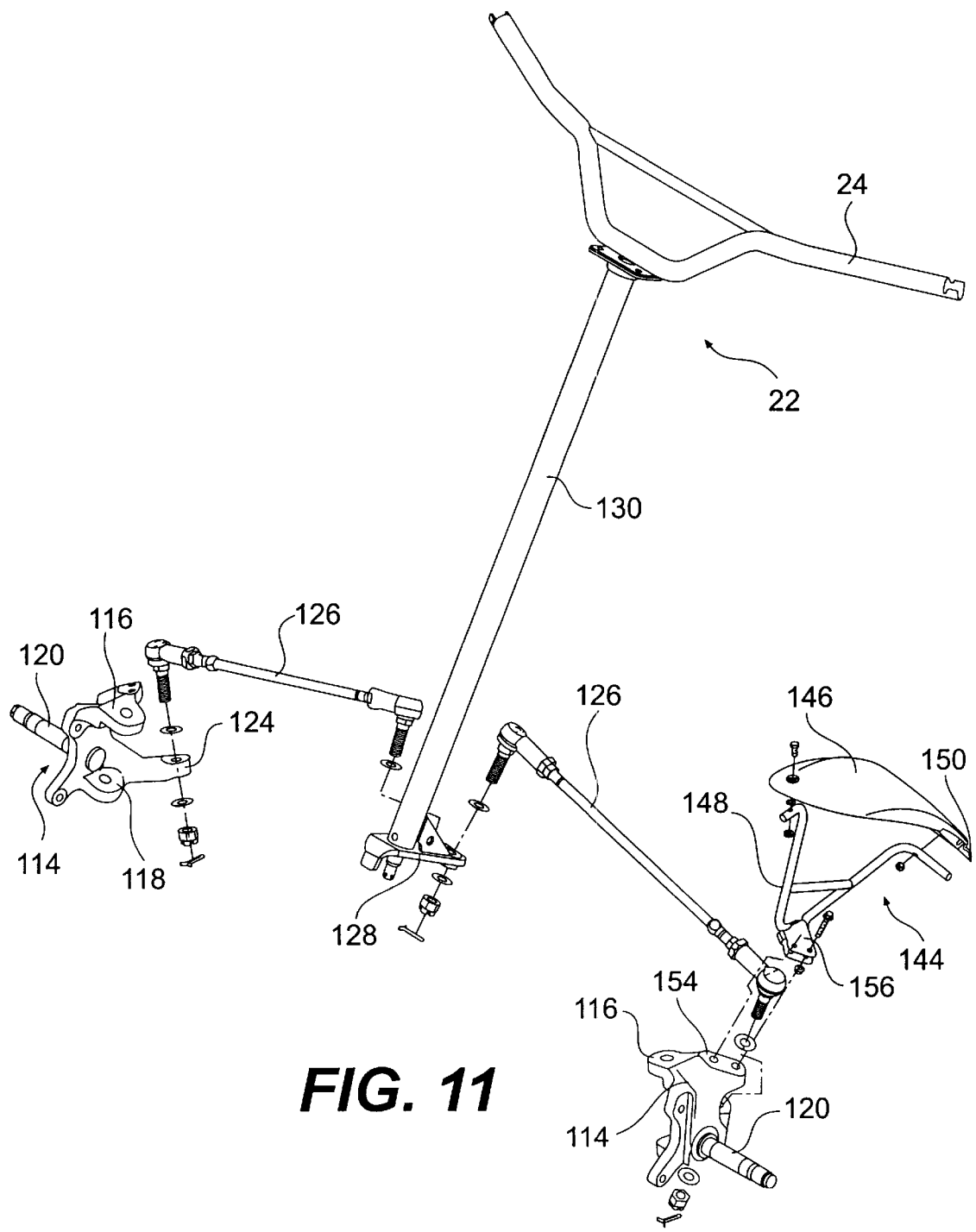
FIG. 11 is an exploded partial view of the steering assembly and front fender in accordance with this invention.

Referring to FIG. 11, each knuckle 114 is also connected to steering assembly 22 at flange 124, which is fastened to steering tie rod 126. A pair of tie rods 126 are fastened to base 128 and extend from steering assembly 22 adjacent steering column 130. As steering column 130 is rigidly connected to base 128, steering motion 30 actuated by handle bars 24 translates through column 130 and base 128 to tie rods 126, which in turn pull or push knuckles 114 and the associated front wheel hub in the desired steering direction.

Figure 12:
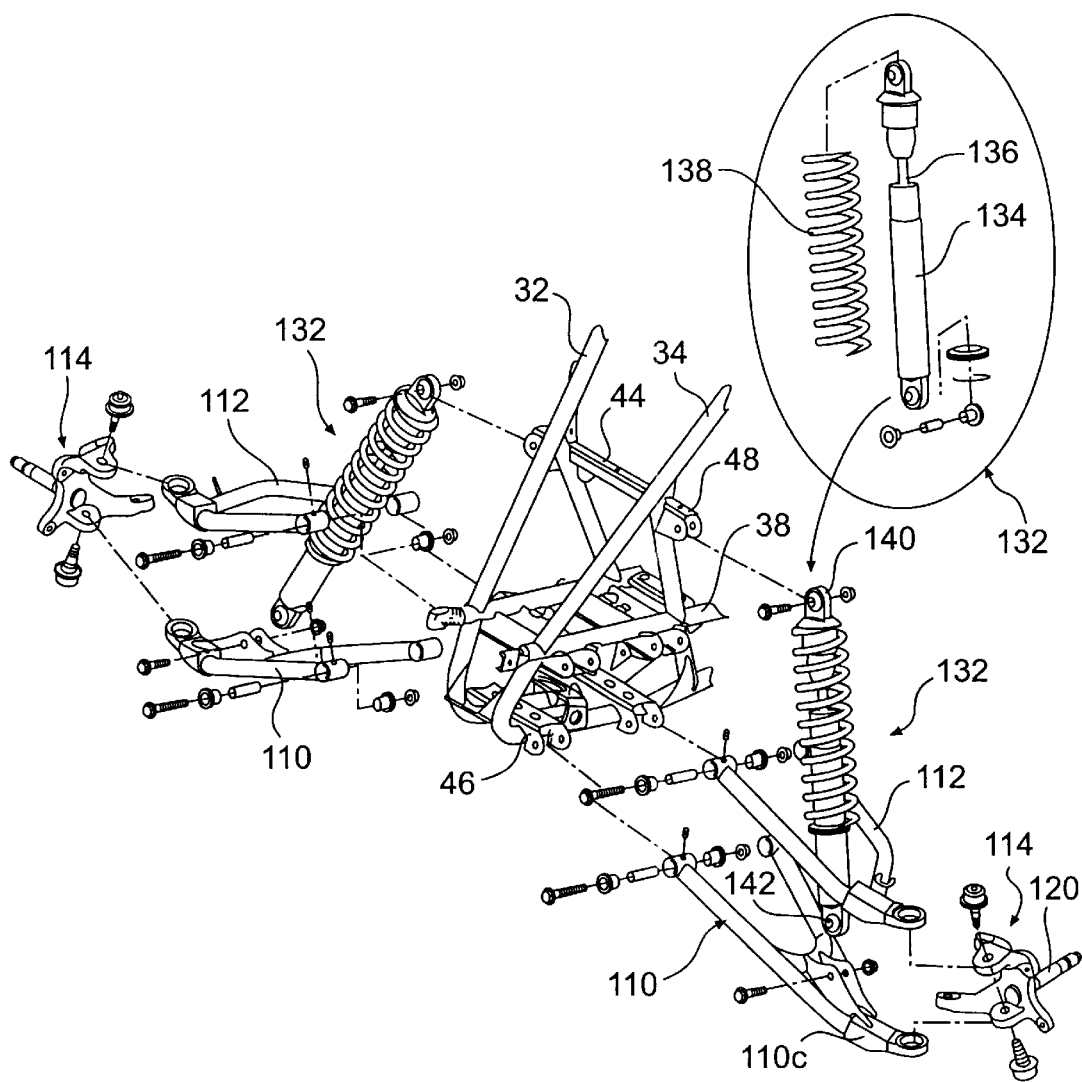
FIG. 12 is an exploded perspective view of the front frame and suspension in accordance with this invention.

Front suspension 132 is shown in detail in FIG. 12. Front suspension 132 is a shock absorber with a cylinder 134 and piston 136 surrounded by a helically wound heavy duty spring 138. One end 140 of the shock absorber is pivotally fastened to main frame 12 at channel bracket 48. The other end 142 of the shock absorber is pivotally attached to lower arm 110 adjacent vertex 110c. Front suspension 132 allows the front wheels to move vertically with respect to the frame and independently of each other to improve the ride and enhance stability. As discussed above, the suspension system of the vehicle of the preferred embodiment provides a wide range of vertical travel. In this case, front suspension 132 preferably has a vertical travel of about 305 mm (12.0 inches).

The front wheel hubs are widely set apart for increased stability. In the preferred embodiment, the span between the outer edges of front wheels is in the range of 1110–1230 mm (43.7–48.4 inches), for example about 1170 mm (46.1 inches). The rear wheel hubs are also set apart with the outer edges of the rear wheels being spaced within a range of 1205–1335 mm (47.4–52.6 inches), for example about 1270 mm (50.0 inches). The front wheel track from hub to hub is preferably within a range of 995–1100 mm (39.2–43.3 inches), for example about 1048 mm (41 in.) and the rear wheel track from hub to hub is preferably in the range of 940–1040 mm (37.0–40.9 inches), for example about 990 mm (39 in). Thus, the front wheel track is slightly larger than the rear wheel track. The axis of rotation of the front wheels 14 is spaced from the axis of rotation of the rear wheels 16 by a distance in the range of about 1250–1350 mm (49.2–53.1 inches), which also forms a stable wheel base. The ratio between the wheel base and the wheel tracks is roughly 1.3, which greatly enhances stability. The clearance beneath the frame at the front and under the engine as shown is about 279 mm (11 inches). The clearance under the drive train at the rear axle as shown is about 121 mm (4.75 inches). The wide set wheel base and wheel tracks, particularly coupled with the enhanced suspension system, adds to the stability of the vehicle.

Secured to each knuckle 114 is front fender assembly 144. There is a front fender assembly 144 provided for each front wheel 14. Front fender assembly 144 includes a fender 146, a fender support 148 and an optional mud flap 150. Fender 146 is a rigid sheet member, which is generally convex and shaped to generally complement a section of the outer edge of the front wheel. Fender 146 is supported by fender support 148, which is a V-shaped support bracket having a pair of support arms fastened to either end of fender 146. As seen in FIG. 11, fender assembly 144 is secured to the top edge 154 of knuckle 114 by a pair of fasteners that clamp bracket 156 onto knuckle 114. Fender 146 is supported at a distance from the outer edge of the front tire to provide sufficient clearance for the front wheel to turn even when caked with mud and debris and/or when the inner side of fender 146 has an accumulation of debris. The front edge of fender 146 is positioned to provide a clear line of sight to the front edge of the front wheel for the rider, as seen in FIG. 5.

Alternatively, fender assembly 144 may be pivotally attached to knuckle 114 to allow at least fender 146 to pivot with respect to the axis of rotation of the front wheel to provide access to the front wheel and to move away from ground obstacles. As seen in FIG. 13A, fender support 148 can be pivotally connected to knuckle 114 with a spring biased connector 158 that allows fender support 148 to pivot with respect to knuckle 114 along the axis of rotation of the front wheel. A spring may be used to bias the fender support into the normal operating position. FIG. 13A shows a simple hinge spring, but any biasing element may be used, including but not limited to a compression, coil or leaf spring or a rubber grommet assembly.

Also, rather than providing the pivotal connection at the knuckle 114, fender 146 may be pivotally, releasably connected to fender support 148. As seen in FIG. 13B, fender 146 may have a snap fit connection 160 that releasably connects to fender support 148. A biasing member may be provided to return fender 146 to the operating position.

Figure 13:
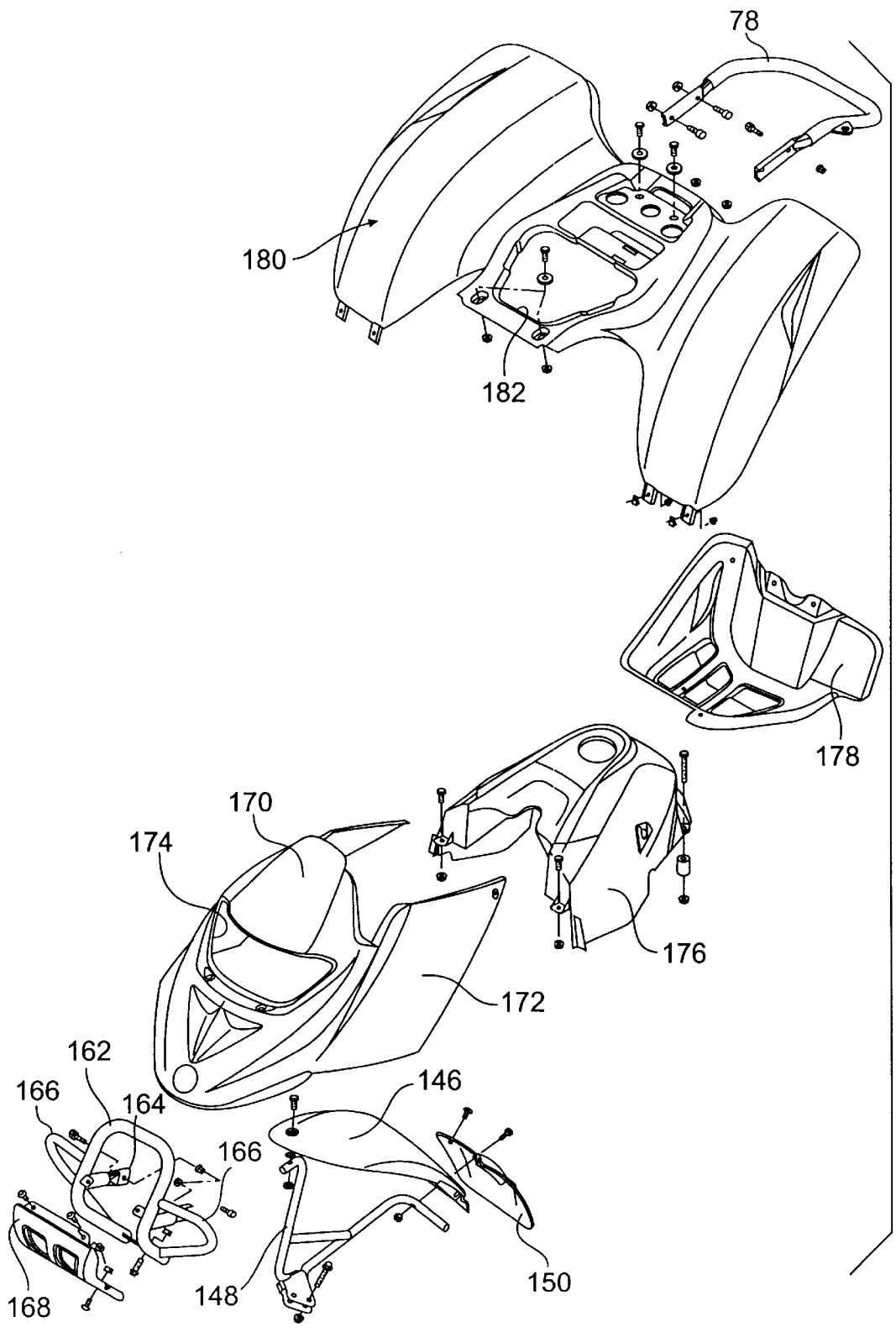
FIG. 13 is an exploded perspective view of protective covers and accessories in accordance with this invention.
Figure 13A:
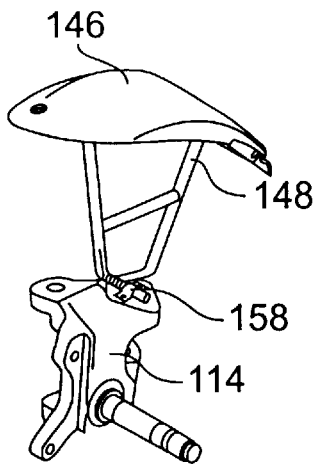
FIG. 13A is a perspective view of an embodiment of the front fender in accordance with this invention.
Figure 13B:
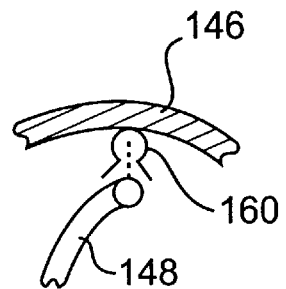
FIG. 13B is a partial side view in cross section of an embodiment of the fender and fender support in accordance with this invention.
Figure 13C:
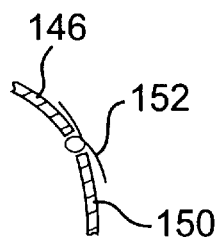
FIG. 13C is a partial side view in cross section of an embodiment of the fender and mudflap in accordance with this invention.

Mud flap 150 can be a separate element fastened to the rear edge of fender 146, as seen in FIG. 13, or integrally formed with fender 146. Mud flap 150 is preferably a flexible sheet made of a resilient, highly durable plastic material, such as vinyl. However, mud flap 150 may be formed of a rigid material. In this case, or even when resilient material is used, mud flap 150 can be fastened to fender 146 with a pivotal or releasable connection 152, as seen in FIG. 13C. The connection 152 can be spring loaded to allow mud flap 150 to pivot upwardly upon impact with an obstacle. Similarly, mud flap can be configured to break free from fender 146 if an obstacle is encountered.

In operation, due to the direct connection between the fender and the front wheel assembly 14, fender assembly 144 turns with front wheels 14. Thus, front fenders 146 rotate with knuckles 114 about a vertical axis. To accomplish this, it is not necessary that the fender support 148 necessarily be connected to knuckle 114 as long as a connection is made with the front wheel assembly 14 or steering assembly 22, rather than rigidly with the frame. The effect of rotatable fenders is that the rider remains protected from flying debris at all times during operation. This greatly increases rider comfort and safety.

FIG. 13 also shows several of the protective components for vehicle 10. Referring also to FIGS. 1–6, a front bumper 162 is secured to main frame 12 by flanges 164 that connect to brackets 52 at each side frame piece 32 and 34. Front bumper 162 is generally U-shaped to form a grab bar that can be used by a rider to manually maneuver vehicle 10 if necessary. Front bumper 162 has side handles 166 that provide additional grasping portions. Front bumper 162 is preferably formed of a rigid tubular metal member for strength. A skid plate 168 is fastened to front bumper 162 as a protective plate for oncoming obstacles. Skid plate 168 can be formed of any durable material, preferably a rigid, molded plastic. As seen in FIGS. 3 and 5, front bumper 162 protrudes beyond the front edge of front wheels 14 for protection.

Figure 2:
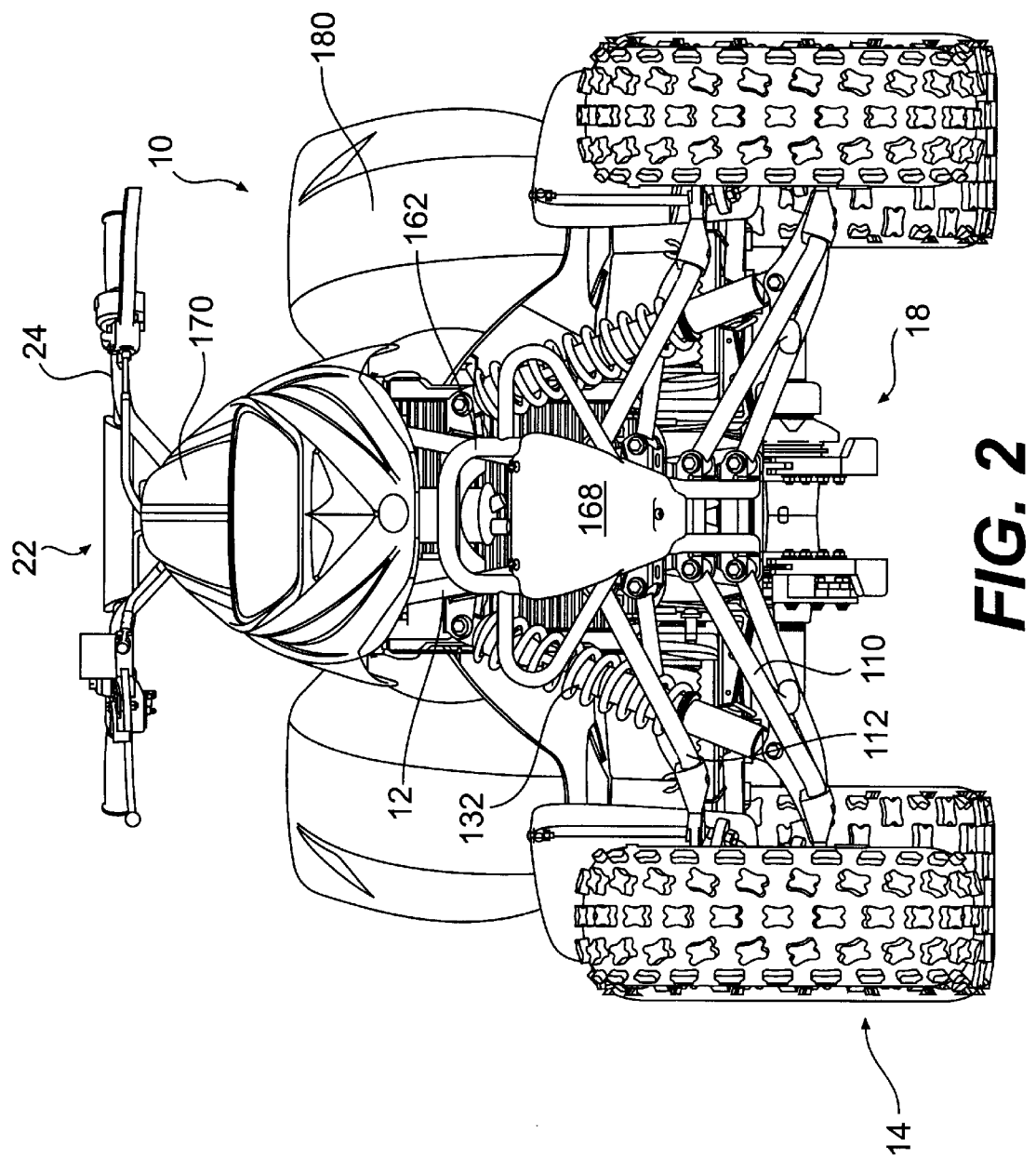
FIG. 2 is a front view of a vehicle in accordance with this invention.

A front cowling 170 is positioned over the upper front portion of the vehicle to protect the rider and drive assembly, to improve the aerodynamics of the vehicle, and to provide an aesthetically pleasing appearance for the vehicle. Front cowling has a front convex portion with wings 172 extending from either side. Various front vents and an opening 174 that frames the head lamp are provided, as seen in FIGS. 1, 2, and 13.

Disposed behind steering assembly 22 and front cowling 170 is a gas tank cover 176 shaped to fit on top of and over both sides of the gas tank. Gas tank cover 176 slopes with the front portion 88 and side wings 89 of seat 20. Gas tank cover 176 is shaped to fit around the steering column and provide access to the gas tank for filling.

A pair of foot protectors 178 are provided at each side of main frame 12 to shield a rider's foot from rear wheels 16. Foot protectors 178 are disposed rearwardly of foot rests 56 and provide an additional support surface for a rider. A rear fender 180 is attached to the upper, rear portion of main frame 12 to cover rear wheels 16. As shown, rear fender 180 extends under seat 20 with an opening 182 for access to the battery. Rear fender 180 is shown as a one piece unit, but may be made of individual components is desired. Mud flaps similar to mud flaps 150 may also be provided if desired.

Front cowling 170, gas tank cover, 176, foot protectors 178 and rear fender 180 are preferably formed of durable rigid sheet material, such as molded plastic, that has a high resistance to impacts and superior weatherability.

Figure 14:
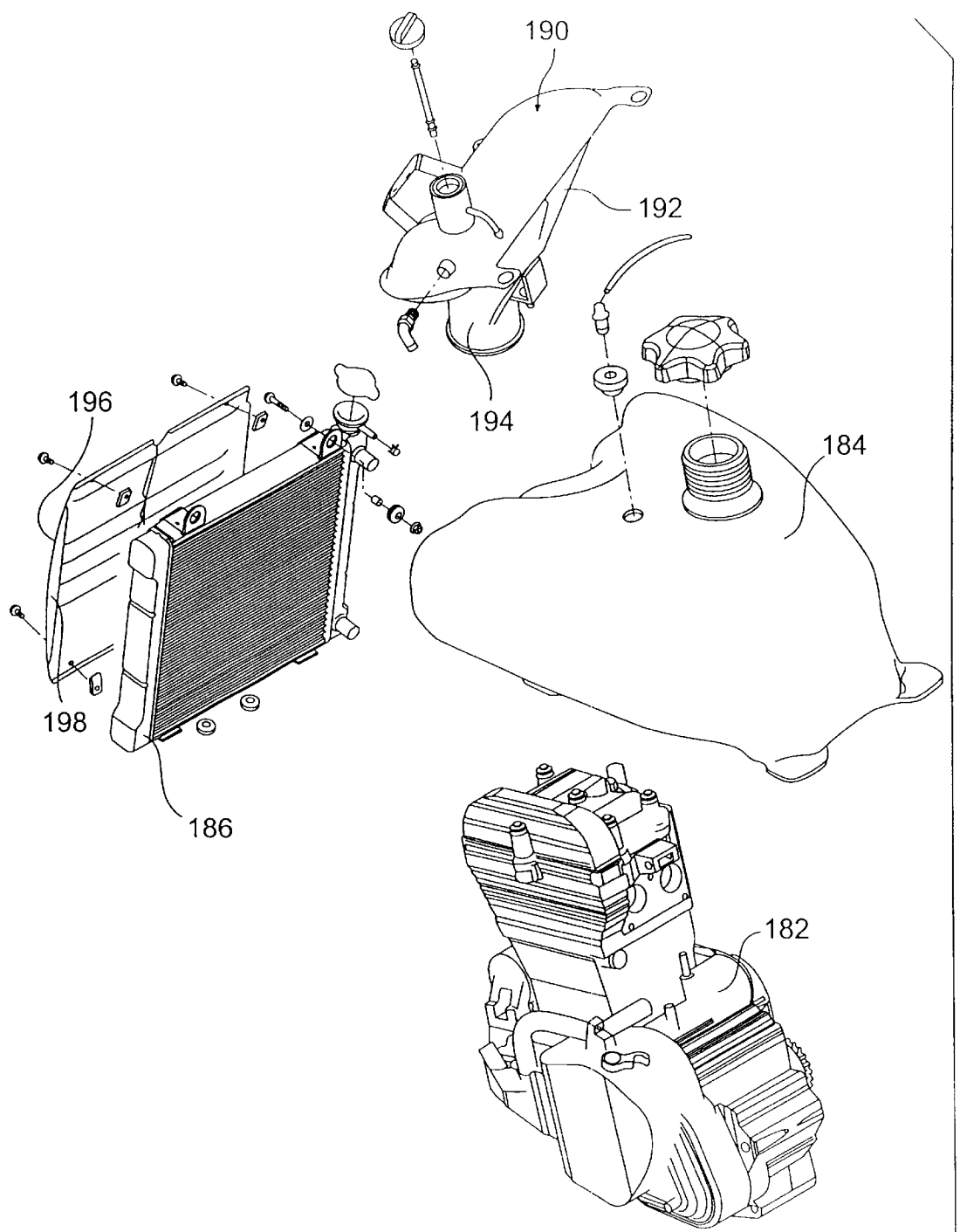
FIG. 14 is an exploded perspective view of the radiator, oil tank, gas tank and engine in accordance with embodiments of this invention.

Finally, retained within main frame 12 is drive system 18. As partially schematically represented in FIG. 14, the drive system 18 includes an engine 182, a fuel system with a gas tank 184, a cooling system with a radiator 186, and a transmission with a drive train 188, best seen in FIG. 4.

Radiator 186 has a protective cover 196 fastened over the front face to protect radiator 186 from damage during operation. Cover 196 is outwardly convex and thus is spaced from the front face of radiator 186. The convexity adds strength and stiffness to the sheet material of cover 196 and ensures that any small penetrations of cover 196 will not affect radiator 186. Cover 196 has side edges 198 that have a flat edge to meet radiator 186 and a curved edge to match the outer surface that stiffen cover 196 and further protect radiator 186.

Figure 18:
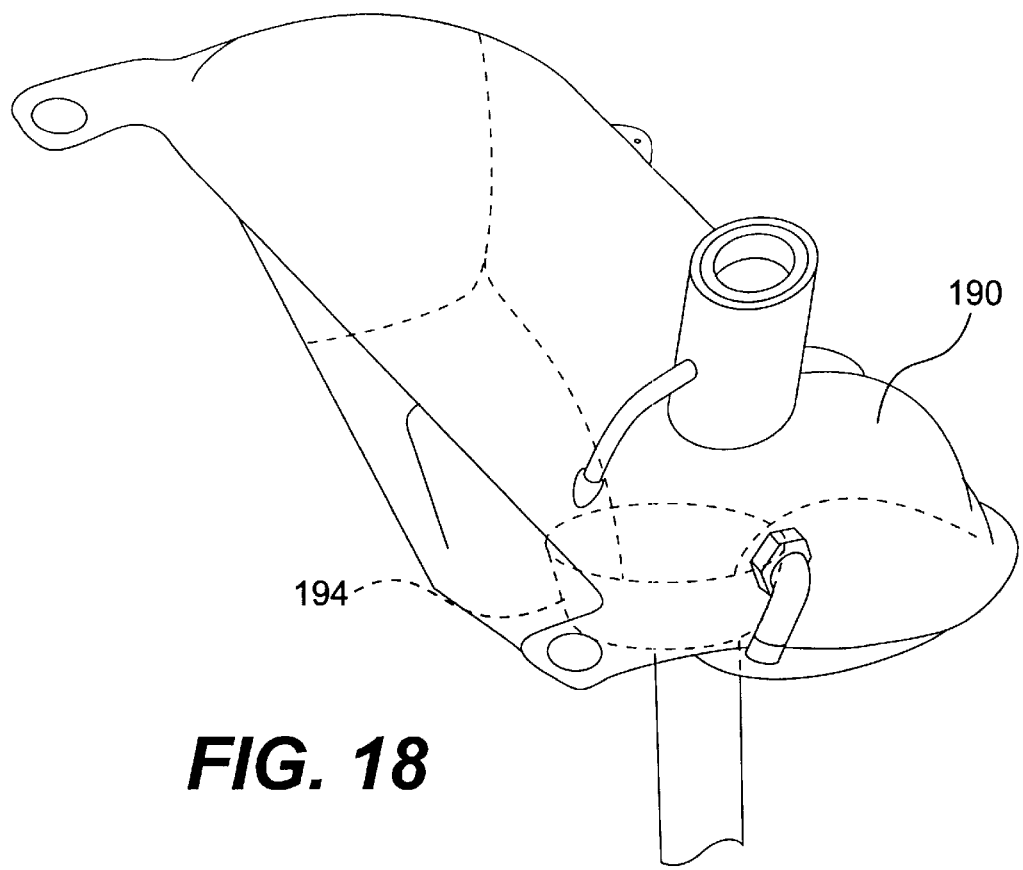
FIG. 18 is a perspective view of the oil tank of the vehicle of the present invention.
Figure 19:
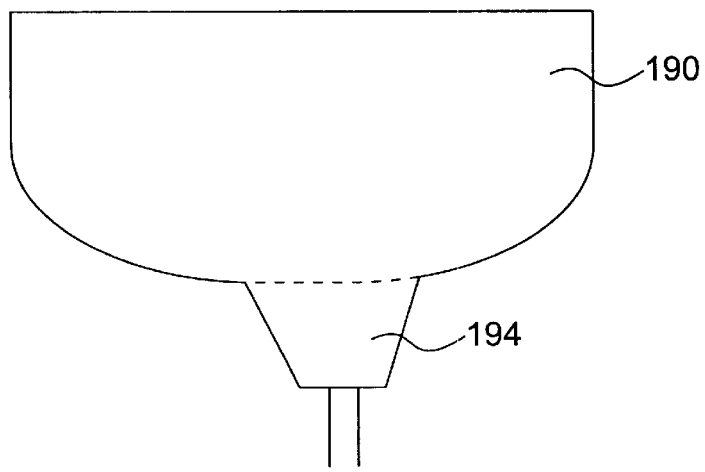
FIG. 19 is a side view of the general design of the oil tank for the vehicle of the present invention.

As shown in greater detail in FIGS. 18 and 19, oil tank 190 is provided for the engine with a gravity feed arrangement. Oil tank 190 has a main chamber 192 formed in a generally funnel, tapered shape that leads to a sump 194. The funnel shape is shown in general detail in FIG. 19. The shape of oil tank 190 ensures that oil will be supplied to engine 182 when vehicle 10 is tipped at any angle from the horizontal. As oil is funneled to sump 194 in all but horizontal positions, oil delivery can be assured.

Figure 17:
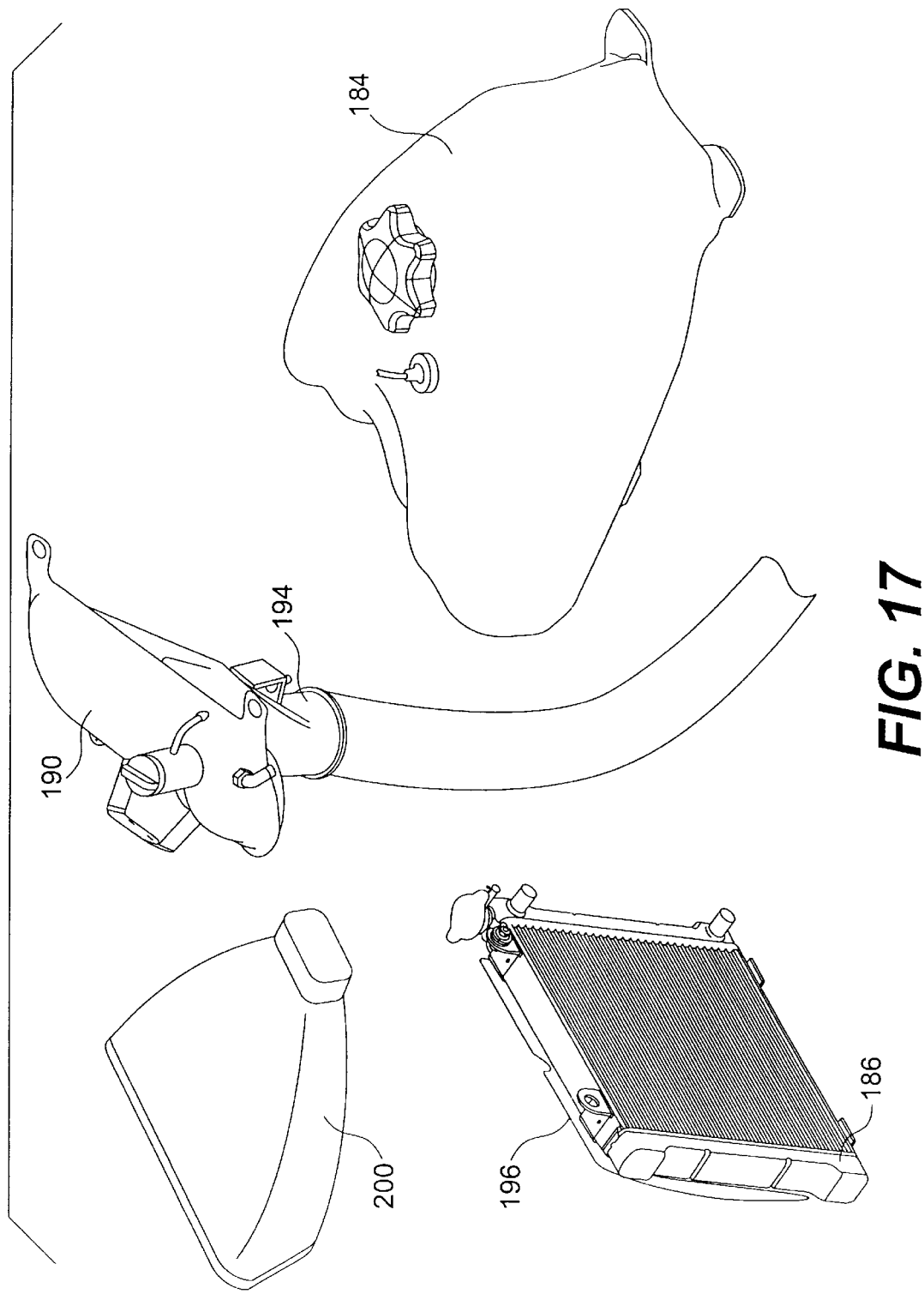
FIG. 17 is a perspective view of several components of the vehicle of the present invention, showing their positional relationship with respect to one another.

As shown in FIG. 17, oil tank 190 is positioned above gas tank 184, behind radiator 186 and lighting fixture 200. The arrangement of these elements in this manner provides a compact, yet efficient, arrangement.

Other conventional components of a drive system, such as an exhaust system, are provided as seen in the figures but need not be described in detail as one of ordinary skill in the art would readily recognize the remaining drive components.

All of the above noted dimensions are provided merely for purposes of description and are in no way intended to be limiting. The various parameters could of course be varied and remain within the scope of the invention.

The embodiments described herein are intended to be illustrative of this invention. As will be recognized by those of ordinary skill in the art, various modifications and changes can be made and would remain within the scope of the invention defined in the appended claims.

What is claimed is:

1. A straddle vehicle, comprising:
   a frame having an upper portion;
   a plurality of wheels supported by the frame;
   a drive assembly supported by the frame including an engine operatively connected to at least one of the plurality of wheels to impart drive power to the at least one wheel; and
   a contoured seat for a rider supported by the upper portion of the frame, the seat having an end section and a central section,
   wherein the seat has a top profile that has a narrowed section in the central section that tapers inwardly from the end section, which is wider than the central section, and
   wherein the seat further includes side wing sections positioned forward of the central section, the side wing sections extending from opposite sides of the central section and having end portions tapered outwardly from the central section to extend outwardly of the end section, such that a rider's knee and lower thigh can engage the side wing sections.

2. The vehicle of claim 1, wherein the seat has an upper surface that is concave and upwardly-curved with both ends at a greater height than the central section thus creating a dip, and
   wherein a seated rider is positioned on the seat such that a rider's knee and lower thigh are positioned in the dip.

3. The vehicle of claim 1, further composing a plurality of foot rests attached to the frame forward of a narrowest portion of the central section of the seat.

4. The vehicle of claim 1, wherein at least a portion of the end portions of the side wing sections is positioned substantially vertically above a portion of the engine.

5. The vehicle of claim 1, wherein the seat has a side profile, with the central section having a first height measured with respect to a horizontal support surface, and the end section having a second height measured with respect to the horizontal support surface, and
   wherein the first height is less than the second height, and the narrowed section coincides with the central section.

6. The vehicle of claim 5, wherein the vehicle is an all terrain vehicle.

7. The vehicle of claim 5, wherein the plurality of wheels includes two front wheels and two rear wheels.

8. The vehicle of claim 5, wherein padded sections are disposed on either side of the frame forwardly of the central section so that a rider's legs can clamp the padded sections.

9. The vehicle of claim 5, wherein padded sections are disposed on either side of the frame below the central section of the seat so that a rider's legs can clamp the padded sections.

10. The vehicle of claim 5, further comprising:
    two fender supports, each attached to one of the front wheels, so that each fender support turns with the wheel about its vertical axis; and
    two fenders, each attached to the each fender support.

11. The vehicle of claim 5, wherein the end section is disposed rearwardly of the central section.

12. The vehicle of claim 5, further comprising:
    a frame extension extending from a rear portion of the frame,
    wherein the frame extension forms an obtuse angle with the upper portion of the frame to define an upwardly-extending, generally obtuse seat support.

13. The vehicle of claim 12, further comprising:
    two foot rests, each extending from opposed sides of the rear portion of the frame,
    wherein the upwardly-extending, generally obtuse seat support is disposed proximally vertically above the foot rests so that the knees of a rider seated on the vehicle are disposed at a lowest point of the seat support.

14. The vehicle of claim 5, wherein the seat includes a front cushion portion positioned toward a front portion of the frame forwardly of the central section.

15. The vehicle of claim 14, wherein the front cushion portion has a third height defined with respect to the horizontal support surface that is higher than the first height.

16. The vehicle of claim 14, wherein the third height is equal to the second height.

17. The vehicle of claim 14, wherein the end section is disposed rearwardly of the central portion, and wherein the third height is greater than the second height.

18. The vehicle of claim 5, further comprising:

two foot rests, each extending from opposed sides of the frame to support a rider's foot, and wherein the central section is positioned proximally vertically above the foot rests such that a rider's knee and lower thigh are disposed on the seat at the first height.

19. The vehicle of claim 18, wherein padded sections are disposed on either side of the frame forwardly of the central section so that a rider's legs can clamp the padded sections.

20. The vehicle of claim 18, wherein padded sections are disposed on either side of the frame below the central section of the seat so that a rider's legs can clamp the padded sections.

21. A straddle vehicle, comprising:

a frame having an upper portion;

a plurality of wheels supported by the frame;

a drive assembly supported by the frame including an engine operatively connected to at least one of the plurality of wheels to impart drive power to the at least one wheel; and a contoured seat for a rider supported by the upper portion of the frame, the seat having an end section and a central section, wherein the seat has a top profile that has a narrowed section in the central section that tapers inwardly from the end section, which is wider than the central section, wherein the seat has a side profile, with the central section having a first height measured with respect to a horizontal support surface, and the end section having a second height measured with respect to the horizontal support surface, wherein the first height is less than the second height, and the narrowed section coincides with the central section, wherein the seat further includes side wing sections extending toward a front portion of the frame, the side wing sections having end portions tapered outwardly from the central section to extend outwardly of the end section, and wherein the side wing sections are padded.

22. The vehicle of claim 21, wherein at least a portion of the end portions of the side wing sections is positioned substantially vertically above a portion of the engine.

23. The vehicle of claim 21, wherein the seat includes a front cushion portion positioned toward a front portion of the frame forward of the central section.

24. The vehicle of claim 23, wherein the front cushion portion has a third height defined with respect to the horizontal support surface that is higher than the first height.

25. The vehicle of claim 23, wherein the third height is equal to the second height.

26. The vehicle of claim 23, wherein the end section is disposed rearwardly of the central portion, and wherein the third height is greater than the second height.

27. A straddle vehicle, comprising:

a frame having a front portion and an upper portion;

two wheel supports coupled to the front portion of the frame;

two wheels, each rotatably connected to a wheel support to rotate about an axis of rotation;

two fender supports, each connected to one wheel support;

two fenders, each coupled to one fender support and positioned over one of the wheels, wherein each of the two fenders is pivotable about an axis of rotation that is parallel to the axis of rotation of the two wheels;

a seat for a rider supported by the upper portion of the frame;

a drive assembly supported by the frame including an engine for powering the frame; and a steering mechanism supported by the frame and connected to the wheel supports to turn the wheels about a vertical axis, wherein, when the wheels are turned by the steering mechanism, the fenders turn about the vertical axis with the wheels.

28. The vehicle of claim 27, wherein the vehicle is an all terrain vehicle.

29. The vehicle of claim 27, wherein the seat is contoured with a central dip positioned to coincide with a rider's knees and lower thighs.

30. The vehicle of claim 27, further comprising: two rear wheels coupled to a rear portion of the frame.

31. The vehicle of claim 27, wherein the fender support includes a pair of rods, each having an end attached to one end of the fender and the other end attached to the wheel support.

32. The vehicle of claim 27, wherein at least a portion of each of the two fenders is releasably coupled to a portion of a respective fender support and releases upon application of a predetermined force.

33. The vehicle of claim 27, wherein the fender is positioned with respect to the wheel so as to provide a clear line of sight to the wheel by a rider seated on the seat of the vehicle.

34. The vehicle of claim 27, wherein the fender includes a main portion shaped to cover a portion of the wheel and a mudflap portion extending from the main portion on a side disposed adjacent a rider.

35. The vehicle of claim 34, wherein the mudflap portion is pivotally attached to the main portion.

36. The vehicle of claim 34, wherein the mudflap portion is releasably attached to the main portion.

37. The vehicle of claim 34, wherein the main portion is rigid and the mudflap portion is flexible.

38. A straddle vehicle, comprising:

a frame having a front portion and an upper portion;

two wheel supports coupled to the front portion of the frame;

two wheels, each rotatably connected to a wheel support;

two fender supports, each connected to one wheel support;

two fenders, each coupled to one fender support and positioned over one of the wheels;

a seat for a rider supported by the upper portion of the frame;

a drive assembly supported by the frame including an engine for powering the frame; and a steering mechanism supported by the frame and connected to the wheel supports to turn the wheels about a vertical axis, wherein, when the wheels are turned by the steering mechanism, the fenders turn about the vertical axis with the wheels, and wherein each of the fender supports is pivotally coupled to a respective one of the wheel supports about an axis of rotation that is parallel to an axis of rotation of a respective one of the wheels.

39. The vehicle of claim 38, wherein the fender support includes a releasable coupling that allows the fender support to pivot upon application of a predetermined force.

40. The vehicle of claim 38, wherein the fender support includes a biasing mechanism that urges the fender support toward a normal operating position over the wheel and allows the fender support to pivot upon application of a predetermined force.

41. The vehicle of claim 38, wherein the fender includes a main portion and a mudflap extending downwardly from the main portion, and wherein the main portion and the mudflap are rigid.

42. A straddle all terrain vehicle, comprising:

a frame having a front portion and an upper portion;

two wheel supports coupled to the front portion of the frame;

two wheels, each rotatably connected to a wheel support;

two fender supports, each connected to one wheel support;

two fenders, each coupled to one fender support and positioned over one of the wheels;

a drive assembly supported by the frame including an engine for powering the frame;

a steering mechanism supported by the frame and connected to the wheel supports to turn the wheels about a vertical axis, wherein, when the wheels are turned by the steering mechanism, the fenders turn about the vertical axis with the wheels;

a contoured seat for a rider supported by the upper portion of the frame, wherein the seat has a side profile and a top profile, wherein the side profile includes a central section with a first height measured with respect to a horizontal support surface, wherein the side profile includes an end section with a second height measured with respect to the horizontal support surface, wherein the first height is less than the second height, and wherein the top profile has a narrowed section coinciding with the central section that tapers inwardly from the end section, which is wider than the central section; and a plurality of foot rests attached to the frame forward of a narrowest portion of the central section of the seat.

\* \* \* \* \*